(12) United States Patent
Smolen et al.

(10) Patent No.: US 7,711,702 B2
(45) Date of Patent: May 4, 2010

(54) SYSTEM AND METHOD FOR IMMUTABLY CATALOGING ELECTRONIC ASSETS IN A LARGE-SCALE COMPUTER SYSTEM

(75) Inventors: Richard Smolen, North Potomac, VA (US); Daniel Earman, Bethesda, MD (US); Rodney Ripley, Silver Spring, MD (US); David Isaac, Bethesda, MD (US)

(73) Assignees: Lockheed Martin Corporation, Bethesda, MD (US); Business Performance Systems, Falls Church, VA (US)

( * ) Notice: Subject to any disclaimer, the term of this patent is extended or adjusted under 35 U.S.C. 154(b) by 306 days.

(21) Appl. No.: 11/790,560

(22) Filed: Apr. 26, 2007

(65) Prior Publication Data

US 2007/0260476 A1 Nov. 8, 2007

Related U.S. Application Data

(60) Provisional application No. 60/802,875, filed on May 24, 2006, provisional application No. 60/797,754, filed on May 5, 2006.

(51) Int. Cl.
*G06F 17/30* (2006.01)
(52) U.S. Cl. ............... 707/200; 707/201; 707/204; 707/104.1; 707/103 R; 707/101
(58) Field of Classification Search ............ 707/10, 707/104.1, 103 R, 101, 200, 201, 204; 709/201
See application file for complete search history.

(56) References Cited

U.S. PATENT DOCUMENTS

| 5,633,875 | A * | 5/1997 | Hershey et al. ............ 370/346 |
| 6,181,336 | B1 | 1/2001 | Chiu et al. |
| 6,369,376 | B1 * | 4/2002 | Gerlach ................. 250/223 R |
| 6,678,700 | B1 * | 1/2004 | Moore et al. ............... 707/200 |
| 6,718,335 | B1 * | 4/2004 | Ball ......................... 707/102 |
| 2002/0123999 | A1 | 9/2002 | Bankhert et al. |
| 2007/0011109 | A1 | 1/2007 | Wilson et al. |
| 2007/0038857 | A1 | 2/2007 | Gosnell |

FOREIGN PATENT DOCUMENTS

WO WO 01/84371 11/2001

OTHER PUBLICATIONS

Arcot Rajasekar, "collection based persistent archive", pp. 1-10, Jan. 2005.*

(Continued)

*Primary Examiner*—Jean M Corrielus
(74) *Attorney, Agent, or Firm*—Nixon & Vanderhye P.C.

(57) ABSTRACT

Systems and/or methods for storing and/or retrieving assets in connection with an extremely large scale computer storage system are provided. An asset catalog may comprise a plurality of asset catalog entries stored according to at least one schema and corresponding to a plurality of assets. A storage architecture may be capable of storing the plurality of assets, with the storage architecture comprising a storage locator and a federator. An item identification scheme may be capable of providing identifiers to reference, locate, and/or access said assets and/or said asset catalog entries stored in the asset catalog in the storage architecture. The computer storage system may be scalable essentially without limitation while maintaining asset storage and retrieval flexibility and substantially obsolescence-proof survivability of assets.

68 Claims, 15 Drawing Sheets

OTHER PUBLICATIONS

Singh et al., A Metadata Catalog Service for Data Intensive Applications, ACM, 2003.*
Consultative Committee for space Data Systems, Recommendation for Space Data System Standards, Jan. 2002.*
Building the Archives of the Future, vol. 7, No. 2, Feb. 2001.*
U.S. Appl. No. 11/790,561, filed Apr. 26, 2007, Smolen et al.
U.S. Appl. No. 11/785,814, filed Apr. 20, 2007, Smolen et al.
U.S. Appl. No. 11/790,562, filed Apr. 26, 2007, Smolen et al.
European Search Report published Oct. 30, 2007.
R. Moore et al.: "Collection-Based Persistent Digital Archives" D-Lib Magazine, vol. 6, No. 3, Mar. 2000 pp. 1-11.
K. Thibodeau: "Building the Archives of the Future" vol. 7, No. 2, Feb. 2001.
Consultative Committee for Space Data Systems: "Reference Model for an Open Archival Information System, Issue: CCSDS 650.0-B-1, Blue Book, Issue 1" Recommendation for Space Data System Standards, Jan. 2002, pp. 1-162.
A. Rejasekar: "MCAT—A Meta Information Catalog (version 1.1)" Mar. 10, 2005.
L. Rosenfeld et al.: "Information Architecture for the World Wide Web" Aug. 2002, pp. 383-412.
Rosenfeld et al., "Information Architecture for the World Wide Web," Aug. 2002, O'Reilley, USA, XP002455087, ISBN: 0-596-00035-9.
Moore et al., "Collection-Based Persistent Digital Archives," D-LIB Magazine (Online). vol. 6, No. 3, Mar. 2000, pp. 1-11, XP002454816, ISSN: 1082-9873; Retrieved on Oct. 12, 2007 online from http://www.dlib.org/dlib/march00/moore/03moore-pt1.html.
Rajasekar, "MCAT—A Meta Information Catalog (Version 1.1)" (Online) Mar. 10, 2005, XP002454818, Retrieved on Oct. 12, 2007 online from http://web.archive.org/web/20050310083942/http://www.npaci.edu/DICE/SRB/mcat.html.
European Examination Report issued in connection with corresponding European Patent Application No. 07251861.6, dated Aug. 27, 2008.
Official Action issued for U.S. Appl. No. 11/790,561, dated May 13, 2009.
Official Action issued for U.S. Appl. No. 11/790,562, dated May 29, 2009.
Official Action issued for U.S. Appl. No. 11/785,814, dated May 5, 2009.

* cited by examiner

SYSTEM AND METHOD FOR IMMUTABLY CATALOGING ELECTRONIC ASSETS IN A LARGE-SCALE COMPUTER SYSTEM

CROSS-REFERENCES TO RELATED APPLICATIONS

This application claims the benefit of Application Ser. No. 60/802,875, filed on May 24, 2006, and Application Ser. No. 60/797,754, filed on May 5, 2006, each of which is incorporated herein by reference in its entirety.

FIELD OF THE INVENTION

The example embodiments disclosed herein relate to an asset catalog for use with electronic records archives. Certain example embodiments disclosed herein relate to a storage architecture in which aggregate-level and item-level catalog entries are stored in a file system in separate locations (e.g., directories, systems or storage tiers, partitions or file systems, etc.), with each entry being an XML document conforming to at least one schema, and a search architecture in which a single instance of a text search engine may be used to index and search aggregate entries, allowing a user to browse between aggregate entries and detailed entries. The asset catalog may serve as an electronic guide to the broader archives, allowing efficient access to billions or trillions of assets.

BACKGROUND AND SUMMARY OF THE INVENTION

1. Introduction

Since the earliest history, various institutions (e.g., governments and private companies alike) have recorded their actions and transactions. Subsequent generations have used these archival records to understand the history of the institution, the national heritage, and the human journey. These records may be essential to support the efficiency of the institution, to protect the rights of individuals and businesses, and/or to ensure that the private company or public corporation/company is accountable to its employees/shareholders and/or that the Government is accountable to its citizens.

With the advance of technology into a dynamic and unpredictable digital era, evidence of the acts and facts of institutions and the government and our national heritage are at risk of being irrecoverably lost. The challenge is pressing—as time moves forward and technologies become obsolete, the risks of loss increase. It will be appreciated that a need has developed in the art to develop an electronic records archives system and method especially, but not only, for the National Archives and Records Administration (NARA) in a system known as Electronic Records Archives (ERA), to resolve this growing problem, in a way that is substantially obsolescence-proof and policy neutral. While embodiments of the invention will be described with respect to its application for safeguarding government records, the described embodiments are not limited to archives systems applications nor to governmental applications and can also be applied to other large scale storage applications, in addition to archives systems, and for businesses, charitable (e.g., non-profit) and other institutions, and entities.

One aspect of the invention is directed to an architecture that will support operational, functional, physical, and interface changes as they occur. In one example, a suite of commercial off-the-shelf (COTS) hardware and software products has been selected to implement and deploy an embodiment of the invention in the ERA, but the inventive architecture is not limited to these products. The architecture facilitates seamless COTS product replacement without negatively impacting the ERA system.

1.1 Understanding the Problem

Another aspect of the ERA is to preserve and to provide ready access to authentic electronic records of enduring value.

In one embodiment, the ERA supports and flows from NARA's mission to ensure "for the Citizen and the Public Servant, for the President and the Congress and the Courts, ready access to essential evidence." This mission facilitates the exchange of vital ideas and information that sustains the United States of America. NARA is responsible to the American people as the custodian of a diverse and expanding array of evidence of America's culture and heritage, of the actions taken by public servants on behalf of American citizens, and of the rights of American citizens. The core of NARA's mission is that this essential evidence must be identified, preserved, and made available for as long as authentic records are needed—regardless of form.

The creation and use of an unprecedented and increasing volume of Federal electronic records—in a wide variety of formats, using evolving technologies—poses a problem that the ERA must solve. An aspect of the invention involves an integrated ERA solution supporting NARA's evolving business processes to identify, preserve, and make available authentic, electronic records of enduring value—for as long as they are needed.

In another embodiment, the ERA can be used to store, process, and/or disseminate a private institution's records. That is, in an embodiment, the ERA may store records pertaining to a private institution or association, and/or the ERA may be used by a first entity to store the records of a second entity. System solutions, no matter how elegant, may be integrated with the institutional culture and organizational processes of the users.

1.1.1 NARA's Evolving Business Processes

Since 1934, NARA has developed effective and innovative processes to manage the records created or received, maintained or used, and destroyed or preserved in the course of public business transacted throughout the Federal Government. NARA played a role in developing this records lifecycle concept and related business processes to ensure long-term preservation of, and access to, authentic archival records. NARA also has been instrumental in developing the archival concept of an authentic record that consists of four fundamental attributes: content, structure, context, and presentation.

NARA has been managing electronic records of archival value since 1968, longer than almost anyone in the world. Despite this long history, the diverse formats and expanding volume of current electronic records pose new challenges and opportunities for NARA as it seeks to identify records of enduring value, preserve these records as vital evidence of our nation's past, and make these records accessible to citizens and public servants in accordance with statutory requirements.

The ERA should support, and may affect, the institution's (e.g., NARA's) evolving business processes. These business processes mirror the records lifecycle and are embodied in the agency's statutory authority:

Providing guidance to Federal Agencies regarding records creation and records management;
Scheduling records for appropriate disposition;
Storing and preserving records of enduring value; and/or Making records available in accordance with statutory and regulatory provisions.

Within this lifecycle framework, the ERA solution provides an integrated and automated capability to manage electronic records from: the identification and capture of records of enduring value; through the storage, preservation, and description of the records; to access control and retrieval functions.

Developing the ERA involves far more than just warehousing data. For example, the archival mission is to identify, preserve, and make available records of enduring value, regardless of form. This three-part archival mission is the core of the Open Archival Information System (OAIS) Reference Model, expressed as ingest, archival storage, and access. Thus, one ERA solution is built around the generic OAIS Reference Model (presented in FIG. 1), which supports these core archival functions through data management, administration, and preservation planning.

The ERA may coordinate with the front-end activities of the creation, use, and maintenance of electronic records by Federal officials. This may be accomplished through the implementation of disposition agreements for electronic records and the development of templates or schemas that define the content, context, structure, and presentation of electronic records along with lifecycle data referring to these records.

The ERA solution may complement NARA's other activities and priorities, e.g., by improving the interaction between NARA staff and their customers (in the areas of scheduling, transfer, accessioning, verification, preservation, review and redaction, and/or ultimately the ease of finding and retrieving electronic records).

1.1.2 Encompassing a Broad Scope of Records

Like NARA itself, the scope of ERA includes the management of electronic and non-electronic records, permanent and temporary records, and records transferred from Federal entities as well as those donated by individuals or organizations outside of the government. Each type of record is described and/or defined below.

ERA and Non-Electronic Records: Although the focus of ERA is on preserving and providing access to authentic electronic records of enduring value, the system's scope also includes, for example, management of specific lifecycle activities for non-electronic records. ERA will support a set of lifecycle management processes (such as those used for NARA) for appraisal, scheduling, disposition, transfer, accessioning, and description of both electronic and non-electronic records. A common, systems approach to appraisal and scheduling through ERA will improve the efficiency of such tasks for non-electronic records and help ensure that permanent electronic records are identified as early as possible within the records lifecycle. This same common approach will automate aspects of the disposition, transfer, accessioning, and description processes for all types of records that will result in significant workflow efficiencies. Archivists, researchers, and other users may realize benefits by having descriptions of both electronic and non-electronic records available together in a powerful, universal catalog of holdings. In an embodiment, some of ERA's capabilities regarding non-electronic records may come from subsuming the functionality of legacy systems such the Archival Research Catalog (ARC). To effectively manage lifecycle data for all types of records, in certain embodiments, ERA also may maintain data interchange (but not subsume) other legacy systems and likely future systems related to non-electronic records.

Permanent and Temporary Records: There is a fundamental archival distinction between records of enduring historic value, such as those that NARA must retain forever (e.g., permanent records) and those records that a government must retain for a finite period of time to conduct ongoing business, meet statutory and regulatory requirements, or protect rights and interests (e.g., temporary records).

For a particular record series from the US Federal Government, NARA identifies these distinctions during the record appraisal and scheduling processes and they are reflected in NARA-approved disposition agreements and instructions. Specific records are actually categorized as permanent or temporary during the disposition and accessioning processes. NARA takes physical custody of all permanent records and some temporary records, in accordance with approved disposition agreements and instructions. While all temporary records are eventually destroyed, NARA ultimately acquires legal (in addition to physical) custody over all permanent records.

ERA may address the distinction between permanent and temporary records at various stages of the records life-cycle. ERA may facilitate an organization's records appraisal and scheduling processes where archivists and transferring entities may use the system to clearly identify records as either permanent or temporary in connection with the development and approval of disposition agreements and instructions. The ERA may use this disposition information in association with the templates to recognize the distinctions between permanent and temporary records upon ingest and manage these records within the system accordingly.

For permanent records this may involve transformation to persistent formats or use of enhanced preservation techniques to insure their preservation and accessibility forever. For temporary records, NARA's Records Center Program (RCP) is exploring offering its customers an ERA service to ingest and store long-term temporary records in persistent formats. To the degree that the RCP opts to facilitate their customers' access to the ERA for appropriate preservation of long-term temporary electronic records, this same coordination relationship with transferring entities through the RCP will allow NARA to effectively capture permanent electronic records earlier in the records lifecycle. In the end, ERA may also provide for the ultimate destruction of temporary electronic records.

ERA and Donated Materials: In addition to federal records, NARA also receives and accesses donated archival materials. Such donated collections comprise a significant percentage of NARA's Presidential Library holdings, for example. ERA may manage donated electronic records in accordance with deeds of gift of deposit agreements which, when associated with templates, may ensure that these records are properly preserved and made available to users. Although donated materials may involve unusual disposition instructions or access restrictions, ERA should be flexible enough to adapt to these requirements. Since individuals or institutions donating materials to NARA are likely to be less familiar with ERA than federal transferring entities, the system may also include guidance and tools to help donors and the NARA appraisal staff working with them insure proper ingest, preservation, dissemination of donated materials.

1.1.3 Meeting the Needs of Users

Systems are designed to facilitate the work of users, and not the other way around. One or more of the following illustrative classes of users may interact with the ERA: transferring entity; appraiser; records processor; preserver; access reviewer; consumer; administrative user; and/or a manager.

The ERA may take into account data security, business process re-engineering, and/or systems development and integration. The ERA solution also may provide easy access to the tools the users need to process and use electronic records holdings efficiently.

1.2 Mitigating Risks and Meeting Challenges

NARA must meet challenges relating to archival of massive amounts of information, or the American people risk losing essential evidence that is only available in the form of electronic federal records. But beyond mitigating substantial risks, the ERA affords such opportunities as:

Using digital communication tools, such as the Internet, to make electronic records holdings, such as NARA's, available beyond the research room walls in offices, schools, and homes throughout the country and around the world;

Allowing users to take advantage of the information-processing efficiencies and capabilities afforded by electronic records;

Increasing the return on the public's investment by demonstrating technological solutions to electronic records problems that will be applied throughout our digital society in a wide variety of institutional settings; and/or Developing tools for archivists to perform their functions more efficiently.

According to one aspect of the invention, there is provided a system for ingesting, storing, and/or disseminating information. The system may include an ingest module, a storage module, and a dissemination module that may be accessed by a user via one or more portals.

In an aspect of certain embodiments, there is provided a system and method for automatically identifying, preserving, and disseminating archived materials. The system/method may include extreme scale archive storage architecture with redundancy or at least survivability, suitable for the evolution from terabytes to exabytes, etc.

In another aspect of certain embodiments, there is provided an electronic records archives (ERA), comprising an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record or file. The storage module may include structure or a program to preserve authenticity of the file or record over time, and/or to preserve the physical access to the record or file over time. The access module may include structure and/or a program to provide a user with ability to view/render the record or file over time, to control access to restricted records, to redact restricted or classified records, and/or to provide access to an increasing number of users anywhere at any time.

The ingest module may include structure or a program to auto-generate a description of the file or record. Each record may be transformed, e.g., using a framework that wraps and computerizes the record in a self-describing format with appropriate metadata to represent information in the template.

The ingest module, may include structure or a program to process a Submission Information Package (SIP), and/or an Archive Information Package (AIP). The access module may include structure or a program to process a Dissemination Information Packages (DIP).

Independent aspects of the invention may include the ingest module alone or one or more aspects thereof, the storage module alone or one or more aspects thereof; and/or the access module alone or one or more aspects thereof.

Still further aspects of the invention relate to a methods for carrying out one or more functions of the ERA or components thereof (ingest module, storage module, and/or access module).

1.3 Archival Problems in General and Drawbacks of Existing Solutions

The challenges faced by NARA are typical of broader archival problems and reveal drawbacks associated with known solutions. Thus, in an embodiment, an ERA may be provided to address some or all of the more general problems. In particular, archives systems exist for storing and preserving electronic assets, which are stored as digital data. Typically, these assets are preserved for a period of time (retention time) and then deleted. These systems maintain metadata about the assets in asset catalogs to facilitate asset management. Such metadata may include one or more of the following:

Attributes to uniquely identify assets;

Attributes to describe assets;

Attributes to facilitate search through the archives;

Attributes to define asset structure and relationships to other assets;

Attributes to organize assets;

Attributes for asset protection;

Attributes to maintain information about asset authenticity; and/or

Status of the asset lifecycle (e.g., planning receipt of asset through eventual deletion).

Unfortunately, these systems all suffer from several drawbacks. For example, there are limitations relating to the scale of the assets managed and, in particular, the size and number of all the assets maintained. These systems also have practical limitations in the duration in which they retain assets. Typically, archives systems are designed to retain data for years or sometimes decades, but not longer. As retention times of assets become very long or indefinite, longevity of the archives system itself, as well as the assets archived, is needed because an archives system's basic requirement is to preserve assets.

But indefinite longevity of an archives system and its assets pose challenges. For example, providing access to old electronic assets is complicated by obsolescence of the asset's format. Regular upgrades of the archives system itself, including migrations of asset data and/or metadata to new storage systems is complicated by extreme size of the assets managed, e.g., if the metadata has to be redesigned to handle new required attributes or to handle an order of magnitude greater number of assets than supported by the old design, then the old metadata generally will have to be migrated to the new design, which could entail a great deal of migration. Extreme scale and longevity make impractical archives systems that are not designed to accommodate unknown, future changes and reduce the impact of necessary change as much as possible.

Archives systems today are built on top of underlying storage systems based on commercial products that are typically comprised of file systems (e.g., Sun's ZFS file system) or relational databases (e.g., Oracle), and sometimes proprietary systems (e.g., EMC Centera). All of these storage systems have limitations in terms of scale (though sometimes the limits can be quite high). In some cases, there may be no products that can make use of the full scale of available file systems. Few of these systems can scale to trillions of entries (e.g., files). Limitations arise for different reasons but can be related to one or more of the following factors, alone or in combination:

- Limitations of object or file identification schemes (e.g., uniqueness of identifiers. www.doi.org provides background on the state of the art for electronic/digital entity identifiers.);
- Catalog limitations (e.g., number of entries, design bottlenecks);
- The number of storage subsystems that can be integrated (sometimes termed horizontal scalability);
- The capacity of underlying storage technologies;
- Search and retrieval performance considerations (e.g., search can become impractical with extreme size);
- The ability to distribute system components (e.g., systems can be difficult to distribute geographically); and/or
- Limitations of system maintenance tasks that are a function of system size (e.g., systems can become impractical to administer with extreme size).

Currently, relational databases (DBs) can scale only to 10 billion objects per instance. Relational DBs also generally do not perform as well as file systems for simple search and retrieval function tasks because they tend to introduce additional overhead to meet other requirements such as fine-grained transactional integrity. There is also no viable product that integrates multiple file systems in a way that provides both extreme scaling and longevity suitable for an archives file system.

2. The Asset Catalog of Certain Example Embodiments

The asset catalog is one component of the ERA system. It may hold metadata that helps understand and manage assets in the Electronic Archives. It also may be structured to support and/or enable search (e.g., federated search) and browse functions to enable users to locate assets of interest. Because there typically is at least one catalog entry for every asset (plus entries representing asset aggregates), the asset catalog must be able to scale to very large numbers of catalog entries while providing useful search features and interactive performance. Furthermore, the asset catalog may be used to help access particular assets or collections of assets. It also may be updated with every ingest and with every accession.

The embodiments disclosed herein represent technical approaches and specific implementations capable of meeting ERA requirements for the asset catalog. One aspect of the embodiments disclosed herein relates to data storage models, and another aspect of the embodiments disclosed herein relates to search server architectures. Two fundamentally different solution classes were implemented using commercially available products. First, a database storage with integrated text search was implemented using products available from Oracle. Second, a file system storage with a separate text search engine was implemented using products available from Autonomy. The products were used as exemplars to evaluate the scalability, performance, functionality, and flexibility characteristics of various storage models and server architectures, and thus the present invention is not limited to such commercial products and the structures associated therewith. To test the overall viability of the configurations, the products were installed and loaded with several million synthetic asset catalog entries and exercised with representative queries. The illustrative schema and the illustrative dictionary used when creating the synthetic asset catalog are set forth below in Section 10. Query functionality, query response time, data storage usage, schema flexibility, and various issues encountered were explored.

It has been determined that a text search engine (e.g., Autonomy) with catalog entries stored as XML documents in a file system provides an advantageous combination of scalability, performance, functionality, and flexibility. This solution may combine the rich text-search features offered by search engines with the known scalability provided by simple file system storage. In addition, this solution may provide the flexibility to use a variety of search products with a variety of file system products, reducing risk and improving evolvability. Missing capabilities (such as XQuery support and intra-record transaction capabilities) are not necessarily a significant concern, because catalog entries generally will be stored and retrieved as whole items. It also has been determined that storing XML documents as shredded XML in an object-relational DBMS (e.g., Oracle) is an acceptable alternative, when several ERA functional search requirements (e.g., keyword suggest) are relaxed or the cost of custom implementation can be borne.

With respect to a search server architecture, it has been determined that a "federation" of multiple search server instances provides an advantageous result. A federator component may be bought or built, because database/search products generally either do not provide them or use proprietary schemas. Furthermore, the search server architecture can be augmented with distributed indexing, clustering, caching, and/or logical partitioning to improve performance and availability.

In certain embodiments, the catalog may be partitioned based on, for example, level of detail (e.g., aggregate vs. individual asset item), the need to phase in search requirements on item-level catalog entries, etc. Because there is likely to be limited or no useful metadata at the item level, indexing item-level catalog entries generally will provide no useful benefits. By focusing search functionality in the near-term on aggregate-level catalog entries then using browse (e.g., from search results) to access item-level catalog entries, the number of search servers required can be greatly reduced from hundreds or thousands to as few as one or two. Additionally or in the alternative, search server federation also can be used to gracefully expand search capabilities over time to the item level as additional metadata (e.g., content summaries) becomes available.

One aspect of certain embodiments relates to storing aggregate-level and item-level catalog entries in the file system in separate directories. Another aspect of certain embodiments relates to using a single instance of a text search engine to index and search aggregate entries only, and providing browse links from aggregate entries to detail entries. Still another aspect of certain embodiments relates to a federator being implemented to standardize the query interface and provide for future growth.

According to certain example embodiments, an extremely large scale computer storage system is provided. An asset catalog may comprise a plurality of asset catalog entries stored according to at least one schema and corresponding to a plurality of assets. A storage architecture may be capable of storing the plurality of assets, with the storage architecture comprising a storage locator and a federator. An item identification scheme may be capable of providing identifiers to reference, locate, and/or access said assets and/or said asset catalog entries stored in the asset catalog in the storage architecture. The computer storage system may be scalable essentially without limitation while maintaining asset storage and retrieval flexibility and substantially obsolescence-proof survivability of assets.

According to certain other example embodiments, a method of managing an extremely large scale computer storage system is provided. An asset catalog comprising a plurality of asset catalog entries stored according to at least one schema and corresponding to a plurality of assets may be provided. A storage architecture may store the plurality of assets, with the storage architecture comprising a storage locator and a federator. Identifiers may be provided via an item identification scheme to locate, access, and/or reference assets and/or asset catalog entries stored in the asset catalog in the storage architecture. The computer storage system may be scalable essentially without limitation while maintaining asset storage and retrieval flexibility and substantially obsolescence-proof survivability of assets.

According to certain other example embodiments, an extremely large scale computer storage system is provided. An asset catalog may be configured to store and/or retrieve a plurality of asset catalog entries. A storage architecture may be capable of storing a plurality of assets and at least one of the plurality of asset catalog entries in at least one storage location in dependence on at least one storage rule. A search interface may be configured to cooperate with one or more search engines to enable indexing of and/or searching for at least one of the asset catalog entries. A federator may be configured to mediate within and/or between the search interface and/or the storage architecture. The plurality of asset catalog entries may include at least entries corresponding to all assets persisted in the computer storage system. The plurality of assets in the storage architecture and the asset catalog entries may be identifiable based on a substantially immutable identification scheme. The asset catalog entries may be represented according to at least one schema. Each asset catalog entry may be representable in an arbitrary relationship with another asset catalog entry. The at least one storage location may be scalable essentially without limitation while maintaining asset storage and retrieval flexibility and substantially obsolescence-proof survivability of assets.

According to still other example embodiments, a system comprising an item identification scheme and/or subroutine, an asset catalog, and a storage subsystem may be provided. The item identification scheme and/or subroutine may associate item (e.g., asset and/or asset catalog entry) identifiers with one or more characteristics. Such characteristics may be structured to support partitioning and/or federation of stored elements (such as asset catalogs and asset repositories) and/or efficient mapping of identifiers to physical storage locations; may be universally unique such that relations and component references may span storage partitions and/or instances of a federations (comprising either or both of component references that are pointers in the asset catalog entry to the physical elements that make up the asset, and relations that are the links among asset catalog entries that are used to create logical and other derived assets, such as collections); and/or may be immutable so that eventual migration of the asset catalog to update obsolete identifiers is avoided, and external references made using these identifiers do not become invalid over time. The asset catalog may include asset catalog entries that together comprise the mechanisms to provide extreme scalability and flexibility. A schema may provide both specific and general metadata tags to provide indexing for search and access, efficiency and flexibility in metadata capture, and interpretation of metadata; support arbitrary relations between catalog entries and component assets to enable multiple views or taxonomies of the assets to be represented; support both parent-child and child-parent relations for flexibility and scalability; support browsing relations such that all assets are reachable even if only a portion have been indexed for searching; provide for multiple representations of the components of an asset to enable long-term preservation, redaction, versioning, and other functions; provide for multiple components with relationships between components to allow efficient cataloging of large numbers of asset components; utilize the item identification scheme described above, which imbues in the asset catalog the advantageous characteristics of the identifiers described above; use label security (e.g., a security mechanism where objects have a security label identifying the access required and where users are assigned the security labels to which they are granted access, generally in contrast to access control lists, which identify users for each object that can access the object; also in contrast to group access, which identify groups (of users) for each object than have access) to enable manageability for very large numbers of assets [it would be impractical to tag all those assets with users; and/or use a tagged-text (e.g., XML) format to enable catalog entries to be stored in a variety of technologies including file systems, relational databases, and object databases, and to enable recovery of content even if schema design information is lost or corrupted (e.g., humans may make sense of XML data by reading the tags even if the XML schema for these XML documents is lost). The storage structure of the asset catalog may be partitioned and/or federated based on the item identification scheme above to enable highly-scalable federated search of the catalog and to provide autonomy in the management of different catalog instances. The overall storage subsystem may comprise mechanisms to provide extreme scalability, flexibility, and longevity. In particular, a storage locator and/or federator may use the structured identifiers above to enable transparent partitioning and federation of storage subsystems; map items to storage locations using item metadata to enable physical storage structures to reflect business requirements or to partition items based on their characteristics to enable search and/or access optimization, and to enable assets and corresponding catalog entries to be physically stored together to improve portability and recoverability (e.g., to allow transparency of: storage locations should they change, data migration to new platforms, use of new commercial storage systems for storage, etc.); allow items to be mapped to multiple locations to improve access performance and availability (e.g., there may be three inputs to the storage locator: metadata, structured identifiers, URI qualifier, with the last indicating whether a replica is to be stored somewhere for a specific purpose, e.g., in both the authoritative repository and a cache repository, thus supporting performance, or a primary and secondary repository thus supporting disaster recovery and/or availability); use URIs for item access to allow transparent usage of multiple types of storage systems/technologies including file systems, relational databases, and object databases; and/or record item storage locations using patterns that have portions for which substitution is done, e.g., of an item identifier, to greatly reduce the size of this storage mapping database used by the locator to find items in storage. This last concept is another aspect that supports scalability—for example, the part and item may be left blank, so that the table entry can indicate where all items for a given package are stored, which keeps the number of entries down by several orders of magnitude.

According to certain example embodiments, an asset catalog for use with an extremely large scale computer storage system is provided. A plurality of asset catalog entries may be stored according to at least one schema and corresponding to a plurality of assets stored in an external storage architecture wherein said assets and asset catalog entries are referenced, located, and/or accessed according to an identification scheme. An asset catalog storage architecture may be capable of storing the plurality of asset catalog entries, the asset catalog storage architecture being federated and partitioned to support searching, indexing, and/or accessing of the plurality of asset catalog entries and/or the plurality of assets using the identification scheme. One or more relations among and/or between at least some of the asset catalog entries and/or assets may be provided, with each said relation being representable by the at least one schema. The asset catalog may be scalable essentially without limitation while maintaining asset storage and retrieval flexibility and substantially obsolescence-proof survivability of assets.

According to certain other example embodiments, a computer-implemented method of managing an asset catalog for use with an extremely large scale computer storage system is provided. A plurality of asset catalog entries may be stored according to at least one schema and corresponding to a plurality of assets stored in an external storage architecture wherein said assets are referenced, located, and/or accessed according to an identification scheme. An asset catalog storage architecture capable of storing the plurality of asset catalog entries may be provided, with the asset catalog storage architecture being federated and partitioned to support searching, indexing, and/or accessing of the plurality of asset catalog entries and/or the plurality of assets using the identification scheme. One or more relations among and/or between at least some of the asset catalog entries and/or assets may be established, with each said relation being representable by the at least one schema. The asset catalog may be scalable essentially without limitation while maintaining asset storage and retrieval flexibility and substantially obsolescence-proof survivability of assets.

According to certain example embodiments, a computer-implemented immutable identification scheme tangibly stored on a computer-readable storage medium for use with an asset catalog and an extremely large scale computer system having an associated storage architecture is provided. The identification scheme may comprise a plurality of identifiers to reference, locate, and/or access a plurality of assets and/or a plurality of asset catalog entries stored in the asset catalog. The identification scheme may enable the asset catalog and/or the large scale computer system to be scalable essentially without limitation while maintaining asset storage and retrieval flexibility and substantially obsolescence-proof survivability of assets.

According to certain other example embodiments, a computer-implemented method of managing an immutable identification scheme for use with an asset catalog and an extremely large scale computer system having an associated storage architecture is provided. The method may comprise providing a plurality of identifiers to reference, locate, and/or access a plurality of assets and/or a plurality of asset catalog entries stored or to be stored in the asset catalog and/or large scale computer system to enable the asset catalog and/or the large scale computer system to be scalable essentially without limitation while maintaining asset storage and retrieval flexibility and substantially obsolescence-proof survivability of assets.

It will be appreciated that as used herein, the term "sub-routine" is broad enough to encompass any suitable combination of hardware, software, and any other form of programmed logic circuitry capable of accomplishing a specified function. It also will be appreciated that the above-described embodiments, and the elements thereof, may be used alone or in various combinations to realize yet further embodiments. For example, the asset catalog, storage subsystem, and item identification scheme each may be used separately or in any combination.

Other aspects, features, and advantages of this invention will become apparent from the following detailed description when taken in conjunction with the accompanying drawings, which are a part of this disclosure and which illustrate, by way of example, principles of this invention.

DETAILED DESCRIPTION

The following description includes several examples and/or embodiments of computer-driven systems and/or methods for carrying out automated information storage, processing and/or access. In particular, the examples and embodiments are focused on systems and/or methods oriented specifically for use with the U.S. National Archives and Records Administration (NARA). However, it will be recognized that, while one or more portions of the present specification may be limited in application to NARA's specific requirements, most if not all of the described systems and/or methods have broader application. For example, the implementations described for storage, processing, and/or access to information (also sometimes referred to as ingest, storage, and dissemination) can also apply to any institution that requires and/or desires automated archiving and/or preservation of its information, e.g., documents, email, corporate IP/knowledge, etc. The term "institution" includes at least government agencies or entities, private companies, publicly traded corporations, universities and colleges, charitable or non-profit organizations, etc. Moreover, the term "electronic records archive" (ERA) is intended to encompass a storage, processing, and/or access archives for any institution, regardless of nature or size.

Figure 1:
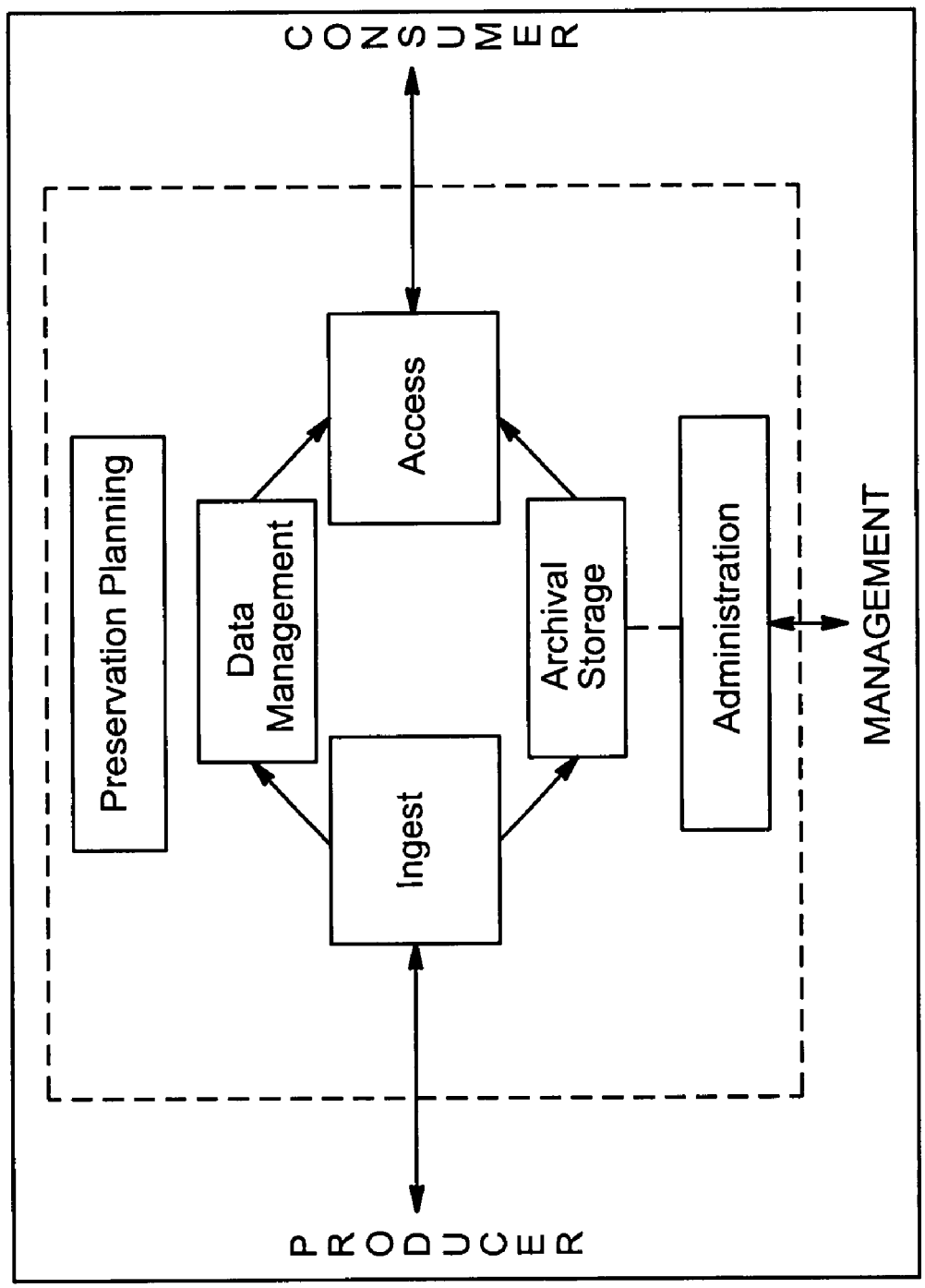
FIG. 1 is a reference model of an overall archives system.
Figure 2:
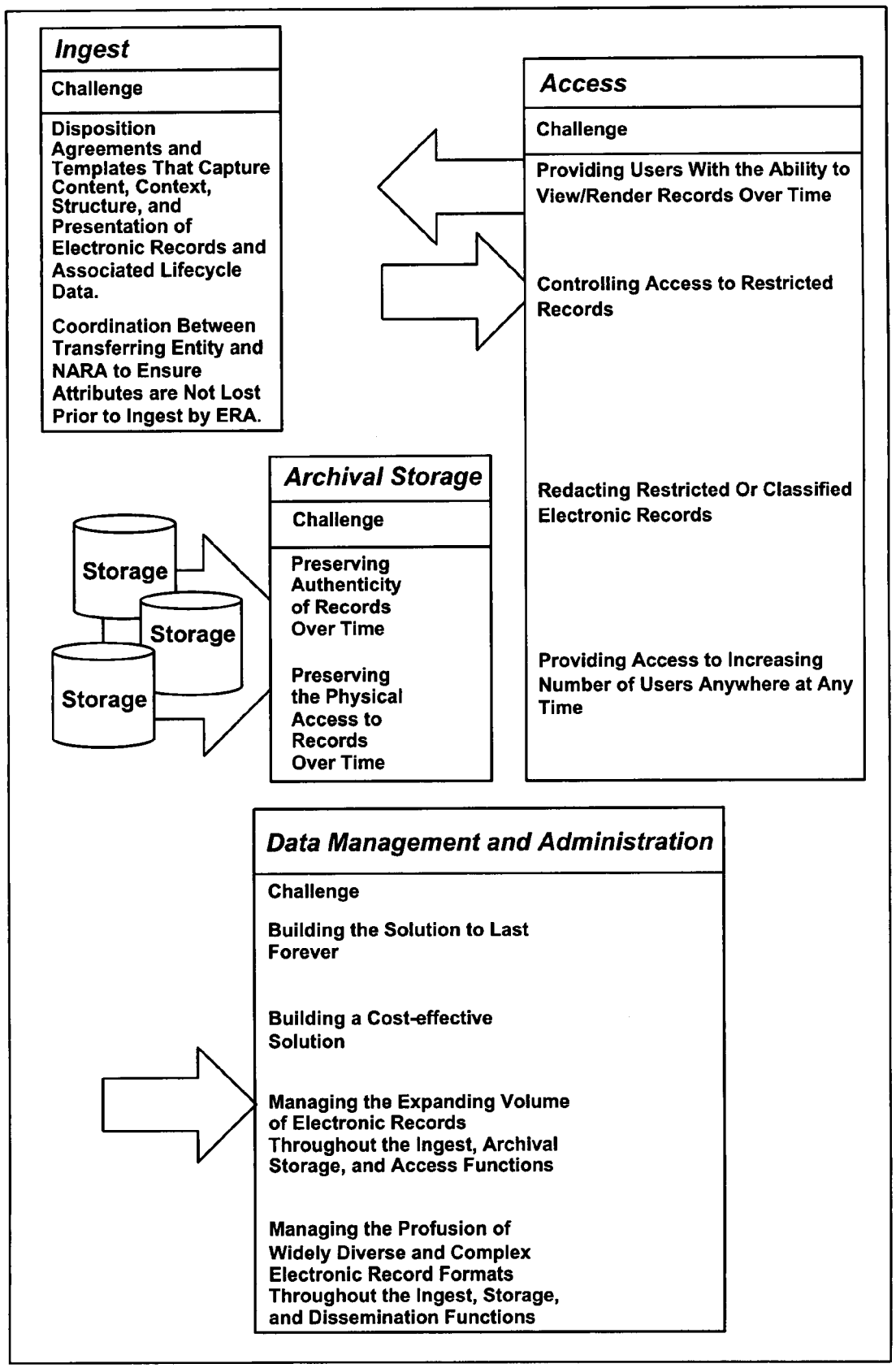
FIG. 2 is a chart demonstrating challenges and solutions related to certain illustrative aspects of the present invention.

As one example, NARA's continuing fulfillment of its mission in the area of electronic records presents new challenges and opportunities, and the embodiments described herein that relate to the ERA and/or asset catalog may help NARA fulfill its broadly defined mission. The underlying risk associated with failing to meet these challenges or realizing these opportunities is the loss of evidence that is essential to sustaining a government's or an institution's needs. FIG. 2 relates specific electronic records challenges to the components of the OAIS Reference Model (ingest, archival storage, access, and data management/administration), and summarizes selected relevant research areas.

At Ingest—the ERA needs to identify and capture all components of the record that are necessary for effective storage and dissemination (e.g., content, context, structure, and presentation). This can be especially challenging for records with dynamic content (e.g., websites or databases).

Archival Storage—Recognizing that in the electronic realm the logical record is independent of its media, the four illustrative attributes of the record (e.g., content, context, structure, and presentation) and their associated metadata, still must be preserved "for the life of the Republic."

Access—NARA will not fulfill its mission simply by storing electronic records of archival value. Through the ERA, these records will be used by researchers long after the associated application software, operating system, and hardware all have become obsolete. The ERA also may apply and enforce access restrictions to sensitive information while at the same time ensuring that the public interest is served by consistently removing access restrictions that are no longer required by statute or regulation.

Data Management—The amount of data that needs to be managed in the ERA can be monumental, especially in the context of government agencies like NARA. Presented herewith are embodiments that are truly scalable solutions that can address a range of needs—from a small focused Instance through large Instances. In such embodiments, the system can be scaled easily so that capacity in both storage and processing power is added when required, and not so soon that large excess capacities exist. This will allow for the system to be scaled to meet demand and provide for maximum flexibility in cost and performance to the institution (e.g., NARA).

Satisfactorily maintaining authenticity through technology-based transformation and re-representation of records is extremely challenging over time. While there has been significant research about migration of electronic records and the use of persistent formats, there has been no previous attempt to create an ERA solution on the scale required by some institutions such as NARA.

Migrations are potentially loss-full transformations, so techniques are needed to detect and measure any actual loss. The system may reduce the likelihood of such loss by applying statistical sampling, based on human judgment for example, backed up with appropriate software tools, and/or institutionalized in a semi-automatic monitoring process.

Table 1 summarizes the "lessons learned" by the Applicants from experience with migrating different types of records to a Persistent Object Format (POF).

TABLE 1

| Type of record | Current Migration Possibilities |
| --- | --- |
| E-mail | The Dutch Testbed project has shown that e-mail can be successfully migrated to a POF. An XML-based POF was designed by Tessella as part of this work. Because e-mail messages can contain attached files in any format, an e-mail record should be preserved as a series of linked objects: the core message, including header information and message text, and related objects representing attachments. These record relationships are stored in the Record Catalog. Thus, an appropriate preservation strategy can be chosen and applied to each file, according to its type. |
| Word processing documents | Simple documents can be migrated to a POF, although document appearance can be complex and may include record characteristics. Some documents can also include other embedded documents which, like e-mail attachments, can be in any format. Documents can also contain macros that affect "behavior" and are very difficult to deal with generically. Thus, complex documents currently require an enhanced preservation strategy.<br>Adobe's Portable Document Format (PDF) often has been treated as a suitable POF for Word documents, as it preserves presentation information and content. The PDF specification is controlled by Adobe, but it is published, and PDF readers are widely available, both from Adobe and from third-parties. ISO are currently developing, with assistance from NARA, a standard version of PDF specifically designed for archival purposes (PDF/A). This format has the benefit that it forces some ambiguities in the original to be removed. However, both Adobe and Microsoft are evolving towards using native XML for their document formats. |

TABLE 1-continued

| Type of record | Current Migration Possibilities |
| --- | --- |
| Images | TIFF is a widely accepted open standard format for raster images and is a good candidate in the short to medium term for a POF. For vector images, the XML-based Scalable Vector Graphics format is an attractive option, particularly as it is a W3C open standard. |
| Databases | The contents of a database should be converted to a POF rather than being maintained in the vendor's proprietary format. Migration of the contents of relational database tables to an XML or flat file format is relatively straightforward. However, in some cases, it is also desirable to represent and/or preserve the structure of the database. In the Dutch Digital Preservation Testbed project, this was achieved using a separate XML document to define the data types of columns, constraints (e.g., whether the data values in a column must be unique), and foreign key relationships, which define the inter-relationships between tables. The Swiss Federal Archives took a similar approach with their SIARD tool, but used SQL statements to define the database structure. Major database software vendors have taken different approaches to implementing the SQL "standard" and add extra non-standard features of their own. This complicates the conversion to a POF. Another difficulty is the Binary Large Object (BLOB) datatype, which presents similar problems to those of e-mail attachments: any type of data can be stored in a BLOB and in many document-oriented databases, the majority of the important or relevant data may be in this form. In this case, separate preservation strategies may be applied according to the type of data held. A further challenge with database preservation is that of preserving not only the data, but the way that the users created and viewed the data. In some cases this may be depend on stored queries and stored procedures forming the database; in others it may depend on external applications interacting with the database. To preserve such "executable" aspects of the database "as a system" is an area of ongoing research. |
| Records with a high degree of "behavioral" properties (e.g., virtual reality models) | For this type of record, it is difficult to separate the content from the application in which it was designed to operate. This makes these records time-consuming to migrate to any format. Emulation is one approach, but this approach is yet to be fully tested in an archival environment. Migration to a POF is another approach, and more research is required into developing templates to support this. |
| Spreadsheets | The Dutch Testbed project examined the preservation of spreadsheets and concluded that an XML-based POF was the best solution, though did not design the POF in detail. The structured nature of spreadsheet data means that it can be mapped reliably and effectively to an XML format. This approach can account for cell contents, the majority of appearance related issues (cell formatting, etc), and formulae used to calculate the contents of some cells. The Testbed project did not address how to deal with macros: most spreadsheet software products include a scripting or programming language to allow very complex macros to be developed (e.g., Visual Basic for Applications as part of Microsoft Excel). This allows a spreadsheet file to contain a complex software application in addition to the data it holds. This is an area where further research is necessary, though it probably applies to only a small proportion of archival material. |
| Web sites | Most Web sites include documents in standardized formats (e.g., HTML). However, it should be noted that there are a number of types of HTML documents, and many Web pages will include incorrectly formed HTML that nonetheless will be correctly displayed by current browsers. The structural relationship between the different files in a web-site should be maintained. The fact that most web-sites include external as well as internal links should be managed in designing a POF for web-sites. The boundary of the domain to be archived should be defined and an approach decided on for how to deal with links to files outside of that domain. Many modern web sites are actually applications where the navigation and formatting are generated dynamically from executed pages (e.g., Active Server Pages or Java Server Pages). The actual content, including the user's preferences on what content is to be presented, is managed in a database. In this case, there are no simple web pages to archive, as different users may be presented with different material at different times. This situation overlaps with our discussion above of databases and the applications which interact with them. |
| Sound and video | For audio streams, the WAV and AVI formats are the de facto standards and therefore a likely basis for POFs. For video, there are a number of MPEG formats in general use, with varying degrees of compression. While it is desirable that only lossless compression techniques are used for archiving, if a lossy |

TABLE 1-continued

| Type of record | Current Migration Possibilities |
| --- | --- |
| | compression was used in the original format it cannot be recaptured in a POF.<br>For video archives in particular, there is the potential for extremely large quantities of material. High quality uncompressed video streams can consume up to 100 GB per hour of video, so storage space is an issue for this record type. |

It is currently not possible to migrate a number of file formats in a way that will be acceptable for archival purposes. One aspect is to encourage the evolution and enhancement of third-party migration software products by providing a framework into which such commercial off-the-shelf (COTS) software products could become part of the ERA if they meet appropriate tests.

When an appropriate POF cannot be identified to reduce the chances of obsolescence, the format may need to be migrated to a non-permanent but more modern, proprietary format (this is known as Enhanced Preservation). Even POFs are not static, since they still need executable software to interpret them, and future POFs may need to be created that have less feature loss than an older format. Thus, the ERA may allow migrated files to be migrated again into a new and more robust format in the future. Through the Dutch Testbed Project, the Applicants have found that it is normally better to return to the original file(s) whenever such a re-migration occurs. Thus, when updating a record, certain example embodiments may revert to an original version of the document and migrate it to a POF accordingly, whereas certain other example embodiments may not be able to migrate the original document (e.g., because it is unavailable, in an unsupported format, etc.) and thus may be able to instead or in addition migrate the already-migrated file. Thus, in certain example embodiments, a new version of a record may be derived from an original version of the record if it is available or, if it the original is not available, the new version may be derived from any other already existing derivative version (e.g., of the original). As such, an extensible POF for certain example embodiments may be provided.

In view of the above aspects of the OAIS Reference Model, the ERA may comprise an ingest module to accept a file and/or a record, a storage module to associate the file or record with information and/or instructions for disposition, and an access or dissemination module to allow selected access to the file or record. The ingest module may include structure and/or a program to create a template to capture content, context, structure, and/or presentation of the record or file. The storage module may include structure and/or a program to preserve authenticity of the file or record over time, and/or to preserve the physical access to the record or file over time. The access module may include structure or a program to provide a user with ability to view/render the record or file over time, to control access to restricted records, to redact restricted or classified records, and/or to provide access to an increasing number of users anywhere at any time.

Figure 3:
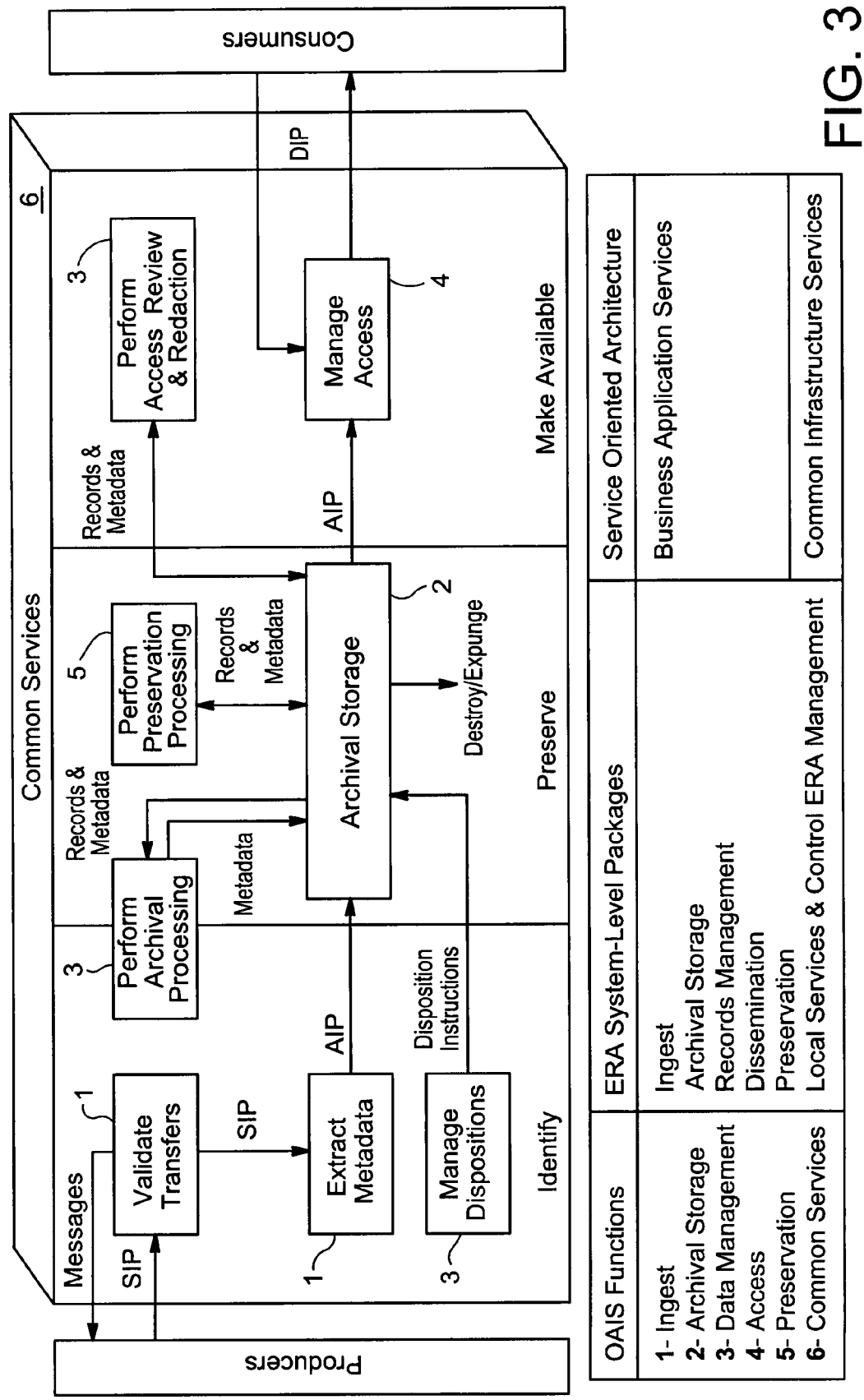
FIG. 3 illustrates the notional life cycle of records as they move through the ERA system, in accordance with an example embodiment.

FIG. 3 illustrates the notional life cycle of records as they move through the ERA system, in accordance with an example embodiment. Records flow from producers, who are persons or client systems that provide the information to be preserved, and end up with consumers, who are persons or client systems that interact with the ERA to find preserved information of interest and to access that information in detail. The Producer also may be a "Transferring Entity."

During the "Identify" stage, producers and archivists develop a Disposition Agreement to cover records. This Disposition Agreement contains disposition instructions, and also a related Preservation and Service Plan. Producers submit records to the ERA System in a SIP. The transfer occurs under a pre-defined Disposition Agreement and Transfer Agreement. The ERA System validates the transferred SIP by scanning for viruses, ensuring the security access restrictions are appropriate, and checking the records against templates. The ERA System informs the Producer of any potential problems, and extracts metadata (including descriptive data, described in greater detail below), creates an Archival Information Package (or AIP, also described in greater detail below), and places the AIP into Archival Storage. At any time after the AIP has been placed into Archival Storage, archivists may perform Archival Processing, which includes developing arrangement, description, finding aids, and other metadata. These tasks will be assigned to archivists based on relevant policies, business rules, and management discretion. Archival processing supplements the Preservation Description Information metadata in the archives.

At any time after the AIP has been placed into Archival Storage, archivists may perform Preservation Processing, which includes transforming the records to authentically preserve them. Policies, business rules, Preservation and Service Plans, and management discretion will drive these tasks. Preservation processing supplements the Preservation Description Information metadata in the archives, and produces new (transformed) record versions.

With respect to the "Make Available" phase, at any time after the AIP has been placed into Archival Storage, archivists may perform Access Review and Redaction, which includes performing mediated searches, verifying the classification of records, and coordinating redaction of records where necessary. These tasks will be driven by policies, business rules, and access requests. Access Review and Redaction supplement the Preservation Description Information metadata in the archives, and produces new (redacted) record versions. Also, at any time after the AIP has been placed into Archival Storage, Consumers may search the archives to find records of interest.

Figure 4:
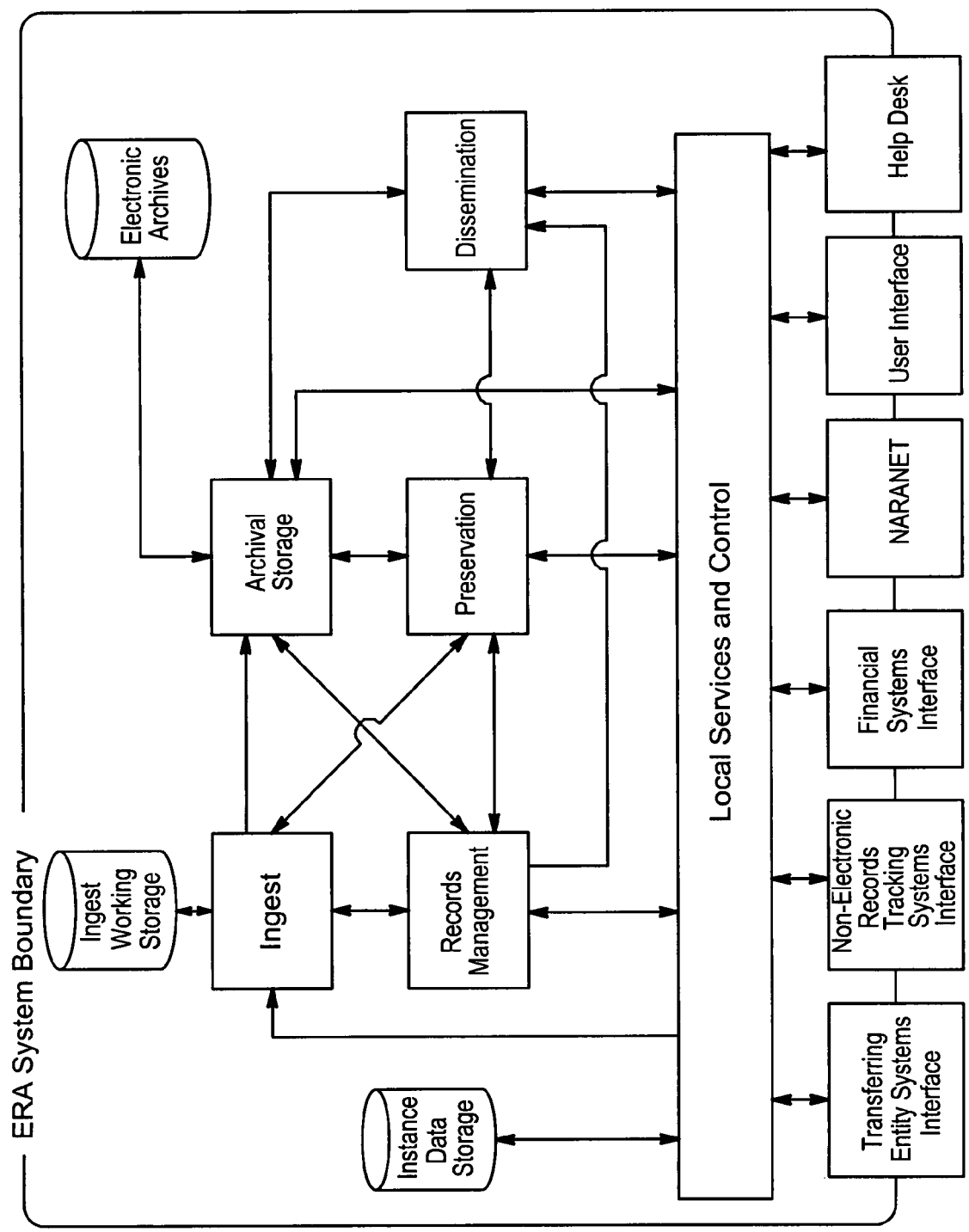
FIG. 4 illustrates the ERA System Functional Architecture from a notional perspective, delineating the system-level packages and external system entities, in accordance with an example embodiment.

FIG. 4 illustrates the ERA System Functional Architecture from a notional perspective, delineating the system-level packages and external system entities, in accordance with an example embodiment. The rectangular boxes within the ERA System boundary represent the six system-level packages. The ingest system-level package includes the means and mechanisms to receive the electronic records from the transferring entities and prepares those electronic records for storage within the ERA System, while the records management system-level package includes the services necessary to manage the archival properties and attributes of the electronic records and other assets within the ERA System as well as providing the ability to create and manage new versions of those assets. Records Management includes the management functionality for disposition agreements, disposition instructions, appraisal, transfer agreements, templates, authority sources, records life cycle data, descriptions, and arrangements. In addition, access review, redaction, selected archival management tasks for non-electronic records, such as the scheduling and appraisal functions are also included within the Records Management service.

The Preservation system-level package includes the services necessary to manage the preservation of the electronic records to ensure their continued existence, accessibility, and authenticity over time. The Preservation system-level service also provides the management functionality for preservation assessments, Preservation and Service Level plans, authenticity assessment and digital adaptation of electronic records. The Archival Storage system-level package includes the functionality to abstract the details of mass storage from the rest of the system. This abstraction allows this service to be appropriately scaled as well as allow new technology to be introduced independent of the other system-level services according to business requirements. The Dissemination system-level package includes the functionality to manage search and access requests for assets within the ERA System. Users have the capability to generate search criteria, execute searches, view search results, and select assets for output or presentation. The architecture provides a framework to enable the use of multiple search engines offering a rich choice of searching capabilities across assets and their contents.

The Local Services and Control (LS&C) system-level package includes the functional infrastructure for the ERA Instance including a user interface portal, user workflow, security services, external interfaces to the archiving entity and other entities' systems, as well as the interfaces between ERA Instances. All external interfaces are depicted as flowing through LS&C, although the present invention is not so limited.

The ERA System contains a centralized monitoring and management capability called ERA Management. The ERA Management hardware and/or software may be located at an ERA site. The Systems Operations Center (SOC) provides the system and security administrators with access to the ERA management Virtual Local Area Network. Each SOC manages one or more Federations of Instances based on the classification of the information contained in the Federation.

Also shown are the three primary data stores for each Instance:
1. Ingest Working Storage—Contains transfers that remain until they are verified and placed into the Electronic Archives;
2. Electronic Archives—Contains all assets (e.g., disposition agreements, records, templates, descriptions, authority sources, arrangements, etc.); and
3. Instance Data Storage—Contains a performance cache of all business assets, operational data and the ERA asset catalog.

Figure 5:
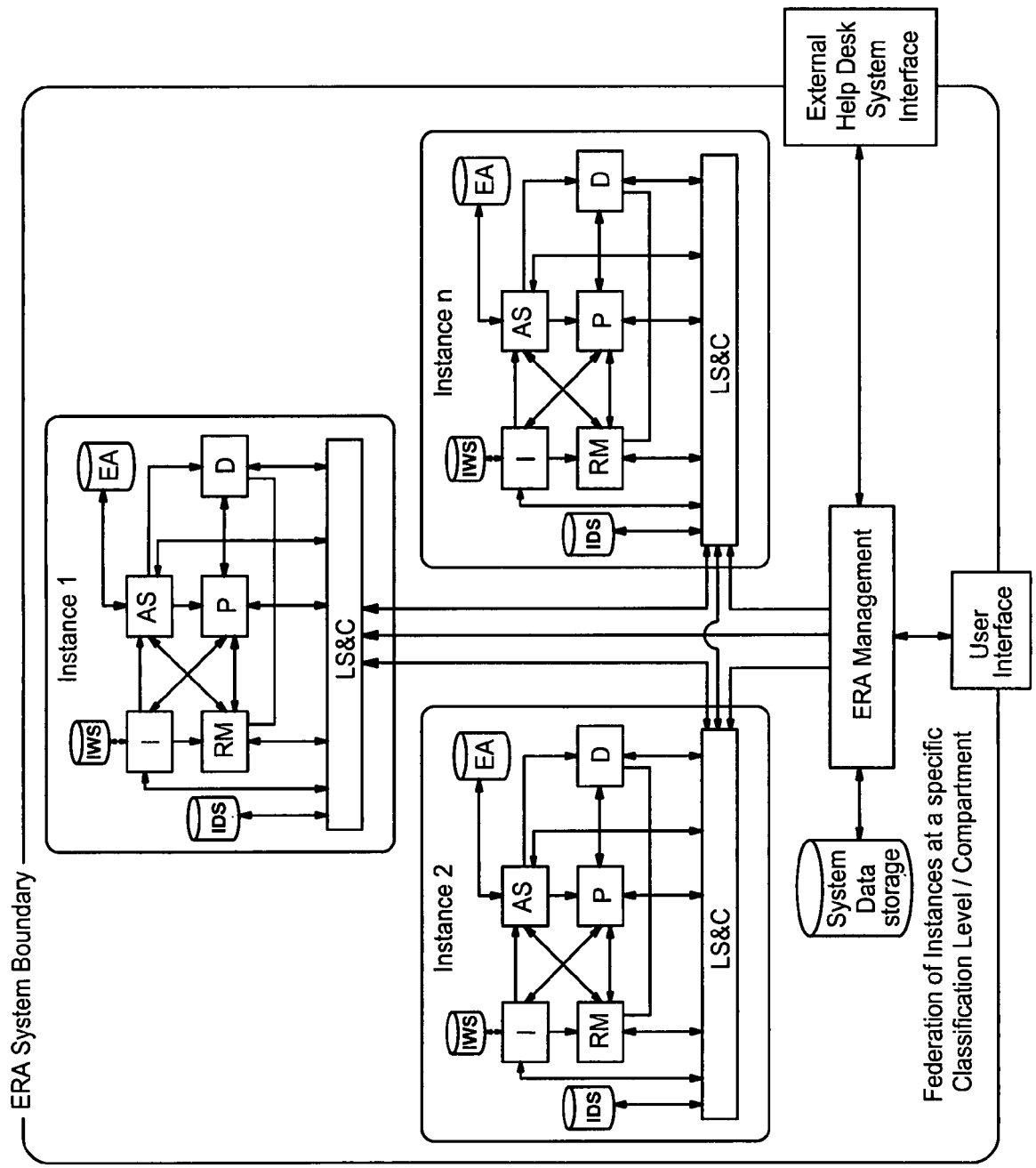
FIG. 5 is a federation of ERA instances, in accordance with an example embodiment.

This diagram provides a representative illustration of how a federated ERA system can be put together, though it will be appreciated that the same is given by way of example and without limitation. Also, the diagram describes a collection of Instances at the same security classification level and compartment that can communicate electronically via a WAN with one another, although the present invention is not so limited. For example, FIG. 5 is a federation of ERA instances, in accordance with an example embodiment. The federation approach is described in greater detail below, although it is important to note here that the ERA and/or the asset catalog may be structured to work with and/or enable a federated approach.

The ERA's components may be structured to receive, manage, and process a large amount of assets and collections of assets. Because of the large amount of assets and collections of assets, it would be advantageous to provide an approach that scales to accommodate the same. Beyond the storage of the assets themselves, a way of understanding, accessing, and managing the assets may be provided to add meaning and functionality to the broader ERA. To serve these and/or other ends, an asset catalog including related, enabling features may be provided.

In particular, to address the overall problems of scaling and longevity, the asset catalog and storage system federator may address the following underlying problems, alone or in various combinations:

Capturing business objects that relate to assets that are particular to the application storing the assets (e.g., in an archiving system, such business objects may include, for example, disposition and destruction information, receipt information, legal transfer information, appraisals and archive description, etc.), with each new business use of the design potentially defining unique business objects that are needed to control its assets and execute its business processes;

Maintaining arbitrary asset attributes to be flexible in accommodating unknown future attributes;

Employing asset and other identifiers that are immutable so that they remain useful indefinitely and, therefore, enable them to be referenced both within the archives and by external entities with a reduced concern for changes over time;

Supporting search and navigation through the extreme scale and diversity of assets archived;

Handling obsolescence of assets that develops over time;

Accommodating redacted and other derivative versions of assets appropriate for an archive system;

Federating (e.g., integrate independent parts to create a larger whole) multiple, potentially heterogeneous, distributed, and independent archives systems (e.g., instances) to provide a larger scale archive system;

Supporting a distributed implementation necessary for scaling, site independence, and disaster recovery considerations where the distribution of assets and associated catalogs may change over time but remain visible to all sites;

Employing a search architecture and catalog format that allows exploitation of multiple, possibly commercial search engines for differing asset data types and across instances of archives in a federation, as future needs may dictate;

Accommodating multiple, heterogeneous, commercial storage subsystems among and within the instances in a federation of archives to achieve extreme scaling and adapt to changes over time;

Supporting a variety of data handling requirements based on, for example, security level, handling restrictions and ownership, in a manner that performs well and remains manageable for an extremely large number of assets and catalog entries;

Supporting storage of any kind of electronic asset;

Supporting transparent data location and migration and storage subsystem upgrades/changes; and/or Supporting reconstruction of the catalog and archives with little or no information other than the original catalog and archived bit streams (e.g., for the purposes of disaster recovery).

Certain example embodiments may provide a structure for cataloging electronic assets archived in a federated storage system that solves one or more of the problems identified above. In particular, the asset catalog may comprise a plurality of asset catalog entries (ACEs) and a storage architecture (or storage subsystem). The storage subsystems may include, for example, an Object Identification Scheme, Storage Structure, and Functional Components. The Functional Components, in turn, may include an Object Identity Service, a Locator Service, a Storage Federator, and/or Central Data Management.

It will be appreciated that these components of the asset catalog, and the asset catalog itself, may be provided in any number of different combinations of hardware and/or software components, architectures, subsystems, or the like. Indeed, any suitable form of programmed logic circuitry including one or both of hardware and/or software may be used in certain example embodiments.

3. Introduction to the Asset Catalog of Certain Example Embodiments

Broadly stated, the asset catalog may be used to help access particular assets and/or collections or aggregates of assets, while also storing, accessing, and/or retrieving organizations of information and/or arbitrary relationships between assets. The asset catalog also may be updated with every ingest and with every accession and/or other business or ERA process. Thus, it may be thought of as assisting in the understanding and in the management of the ERA as a whole. The following sections describe in more detail the structure and function of the asset catalog.

The following sections detail electronic asset archives systems and methods for an asset catalog and associated storage system federator that have features to support extreme scaling and longevity requirements beyond the capabilities of today's systems. The scale of the archive system may be massive in terms of storage space, number of assets stored, and longevity. For example, certain example embodiments may include features to support up to and beyond 10s of exabytes of storage, up to and beyond tens of trillions of assets stored and cataloged, and/or substantially indefinite asset retention. Of course, these numbers are provided by way of example and without limitation. Indeed, the example embodiments described herein may be configured to support substantially infinite storage space to store a substantially infinite number of records over a substantially infinite amount of time. Systems and methods for both the asset catalog and the storage system federator may be devised to provide this scale of support because an archive storage system may involve the use of a catalog to manage the contents of the items stored.

3.1 Asset Catalog Overview

One aspect of an ERA relates to an asset catalog. Such an asset catalog may hold metadata that helps understand and manage assets in the broader Electronic Archives. In addition, it may be configured to support and/or provide search and browse functions to enable a user to locate one or more particular assets of interest. Thus, the asset catalog may serve as an electronic guide to the ERA. It may hold a listing of archival assets in the ERA potentially including, but not limited to, records transferred from agencies, donations, the general records schedule, and the records schedules for all agencies, as well as the components such as, for example, templates and object and/or file formats, etc. In certain example embodiments, these components may themselves be cataloged and/or may include templates and a data format registry. Because of the size of the asset catalog, one aspect of the asset catalog relates to a search function to be used in connection with the asset catalog.

Additionally, assets may accrete life cycle data as they move through different phases in the ERA system. Some or all of the following illustrative, non-limiting life-cycle events may generate life-cycle data for an asset:

Identify:
   A transferring entity submits an asset to the ERA. The asset may go through antivirus and security access restriction checks. These checks may generate life cycle data about the asset.
   The asset may have certain technical characteristics, such as, for example, file name, file type, size, etc., which may captured and stored as life cycle data.
   The asset may be tied to a Transfer Request, a Record Schedule, and/or a Transfer Agreement. These linkages may be captured as life cycle data.

Preserve:
   A preservation plan may be created for the asset describing one or more of its characteristics.

Make Available:
   A digital transformation may be applied on the asset resulting in a different version of the asset.

It is expected that most of the items in the asset catalog likely only will have life-cycle data from the identify step described above. It will be appreciated that the above-listed events and corresponding life-cycle data are given by way of example and without limitation. These and/or other events may generate similar and/or other life-cycle data that may comprise, and/or be tracked by, the asset catalog.

The design and implementation of the asset catalog presents significant challenges, for example, because of demanding performance and functionality requirements. In particular, the National Archives, an ERA customer, has indicated that the asset catalog should meet the following requirements:

Performance Requirements:
   The system should be able to scale to 10 tera-objects without major design changes; and,
   Single attribute searches within descriptions should be completed within four seconds, multi-attribute searches should be completed within seven seconds; and, concept and proximity searches should be completed within 30 seconds.

Functionality Requirements:
   The system may be structured to provide and/or enable advanced search capabilities (including searches based on concepts, proximity, and question-answer sessions as well as the ability to provide search criteria recommendations), provide search time estimates, and support combined search and record navigation. It will be appreciated that such functions may be provided by the asset catalog itself or via an outside search product (e.g., a COTS search product) and merely supported by the asset catalog. In the latter case, for example, such a search product may interface with asset catalog, with the asset catalog supporting these functions through the provision of proper metadata, linkages, and/or other characteristics enabling these functions at the appropriate scale.

Of course, it will be appreciated that these requirements are specific to a single ERA customer only, and that the invention is not so limited. For example, more or fewer objects may be stored within the asset catalog, search functionality and times to complete such searches may very, etc.

For the purposes of the National Archives, it is assumed that the asset catalog will have a approximately 11 billion entries in the first year and approximately 10 trillion entries within 10 years. The average catalog entry size may be only 2.5 KB. However, entries for record aggregates may have rich descriptive information, whereas entries for individual files may have no such descriptive information.

Catalog entries may be structured documents with a fixed schema. For example, catalog entries may be stored as XML documents with a single fixed schema that includes one or more generic elements structured as <metadata name="someName">someValue</metadata>. Also, catalog entries may be hierarchically structured. For example, certain (e.g., parent) entries may include descriptive information about sets of items and have links to the individual (e.g., child) items. It is anticipated that most searches will be against roughly 1% of the records representing the top levels of the catalog entry hierarchy, and that the remainder of the searches will be against the entire catalog. Roughly 20 attributes in catalog entries should be searchable, including a text description that should be roughly 1 KB for entries at the top levels of the hierarchy and may be much smaller or empty for the remaining entries. However, to increase usability, for example, the entire catalog entry may be viewable by the end user when a search result is returned.

3.2 Evaluation Criteria

Multiple software and/or hardware combinations may be used to determine how the asset catalog should be structured. Certain evaluation criteria may be considered when choosing which software and hardware combinations should be implemented. For example, the following illustrative criteria may be considered when choosing particular software and hardware combinations:

Performance
Scalability
Flexibility
Functionality
Security
Efficiency
Durability/Longevity
Evolvability
Extensibility Of course, it will be appreciated that this list is given by way of example and without limitation. Additionally, these and/or other factors may be weighted according to the needs of the implementation. For example, in extremely large systems, scalability and efficiency may be more important than functionality, whereas functionality may be more important than scalability in implementations that will be used by casual researchers with high frequency.

3.3 Exemplary Asset Catalog Structure and Components

The following sections detail the structure and components of one working example of an asset catalog designed and implemented in accordance with an example embodiment. It will be appreciated that the below description is provided by way of example and without limitation.

3.3.1 The Asset Catalog of Certain Example Embodiments

The asset catalog of certain example embodiments may include information about archived assets that describes, organizes, and relates the assets and is used to search, browse, protect, maintain, and/or administer the assets. More particularly, the asset catalog may include one or more of the following features:

The asset catalog may be a collection of entries for all the persisted assets in ERA;

The asset catalog may have an entry for each asset that describes the asset including its structure, records relationships to other assets, and metadata for that asset;

The asset catalog may have an entry (or entries) for records and other logical constructs (e.g., Record Groups) that are used to organize assets;

The asset catalog may have a hierarchical structure that can be browsed;

The asset catalog may treat objects (e.g., business objects) that relate to target storage assets as assets themselves and link them to the target storage assets;

The asset catalog may be stored in the Electronic Archives and/or an archival storage system with catalog entries physically "near" the assets they catalog to prevent separation of the two;

The asset catalog may be replicated in the Instance Data Store, e.g., a higher performance storage tier, where the catalog is indexed for performance; and/or The asset catalog may support multiple taxonomies (e.g., multiple asset relationships), and may transparently utilize different physical storage mechanisms such as, for example, file systems, relational databases, and/or object databases.

An asset catalog entry (ACE) may include metadata extracted from the asset and/or associated business objects (e.g., administrative information about archived records, such as, for example, an archive record schedule, an agreement used to manage the disposition of electronic record assets, etc). The extracted metadata may be chosen and/or formatted to meet the requirements of the archival system, including efficient discovery of assets, but it will be appreciated the design is flexible so as to allow for the evolution of metadata over time.

Each ACE may include certain elements. These elements may include, for example:

Identifier—a unique and immutable identifier of the asset;

Security Descriptor—defining a set of machine-readable and/or human-readable attributes that provide efficient and flexible expression of access and usage restrictions which, in turn, enable access to be resicted based on security level (e.g., users must have the same or higher level as the object), Handling Restrictions (e.g., users must meet all handling restrictions), and/or Security Groups (e.g., users must be a member of at least one group). Other security controls also may be put into place, which may have a human-readable description of the access control (e.g., "do not let my mother see this") and which may require an authorized user to read and enforce. This type of descriptor also may include both machine- and human-readable attributes that are linked such that manual access review may be initiated automatically. Additionally, physical separation mechanisms (e.g., for storing data on some specified classification on its own disk), may be derived from the security descriptor.

Summary Lifecycle Data—lifecycle elements to facilitate efficient discovery (e.g., Asset Title, Creator, Asset Type, Record Group, Description, Subject, Keyword);

Components—pointers to the physical components that make up the asset, and attributes about these physical components (e.g., Security Descriptor of the asset, File Attributes, Physical Location, Integrity Seal—e.g., an asset integrity seal uniquely derived from the asset that enables detection of corrupted assets should subsequent re-derivation of a seal result in a different seal than the original stored in the metadata);

Relations (also sometimes called References)—named pointers to other asset catalog entries that are associated to this entry (e.g., parent-child relationships, hierarchical relationships, etc.);

Extended Lifecycle Data—additional, extensible lifecycle data elements, for example, organized by logical groupings, e.g., scheduling, appraisal, accessioning, ingest, preservation, events, lifecycle-common (record group #, general records type, source agency); and/or Lifecycle Data Element characteristics (e.g., metadata on metadata), including, for example, descriptions and/or flags for: element description, mandatory, searchable, repeatable, type (e.g., numeric/character), applicability (e.g., record group, series, etc.), authority source, public element, standards mapping, etc.

An ACE may have arbitrary relationships through "Relations" and typically has at least one Relation that identifies the parent in the primary catalog hierarchy. Pointers to other ACEs or assets (e.g., Relations, Components, and the like) may be made via immutable and scalable identifiers provided by the storage subsystem. Use of immutable and scalable identifiers may increase longevity of the asset catalog and may allow external documents and systems to reliably reference catalog entries of assets in the archives.

Metadata in the asset catalog may be flexible and extensible, because the source of metadata is varied. For example, XML may be used for the ACE because it provides an industry standard mechanism for flexible data representation and can allow older ACE versions to coexist with newer versions without necessarily needing to migrate the older versions, while also easing migration if that becomes necessary.

Through the use of relations among catalog entries and/or component assets, an XML-based ACE schema may support arbitrary hierarchies and/or taxonomies of assets to create aggregates of the original asset with other assets. Examples of aggregates may include archive collections, record groups, and file units.

Through the use of relations among catalog entries and component assets, an XML-based ACE schema may support alternative representations of the original asset. Examples of alternative representations may include digital adaptations, such as alternative or modern formats, redacted versions, annotated versions, abridged versions, declassified versions, and/or specific use versions.

The use of parent-child relationships may enable scalability because an ACE typically has few parents but may have an unlimited number of children. In addition, indexing can be used to efficiently find the children of a given ACE. The use of parent-child relationship also may allow security to be inherited through a primary archival control hierarchy to facilitate manageability of large archives.

The asset catalog may support partitioning of the catalog, for example, on the basis of the level of detail of assets and asset categories, to manage the number of ACEs that would be indexed for search functions. This may be facilitated and/or provided by design features, such as support for arranging ACEs into hierarchies, the storing of ACEs in individual XML files that can be partitioned into separate storage areas that can be indexed differently, the ability to selectively index metadata according to other metadata (e.g., asset type and archival level information), etc. This also may support more efficient searching, especially of very large archives.

Also, because there is likely to be a reduced amount of metadata at the item level, indexing item-level catalog entries is not necessarily needed. By focusing search on aggregate-level catalog entries then using browse (from search results) to access item-level catalog entries, the amount of search processing required can be reduced greatly.

Because the asset catalog may be distributed with the assets and may have an open, XML-based design, it may support a federated search architecture, where each independent archive system within the federation may have an independent search capability. In one example, the asset catalog entries of the entire federation may be available to each federation member.

Figure 8:
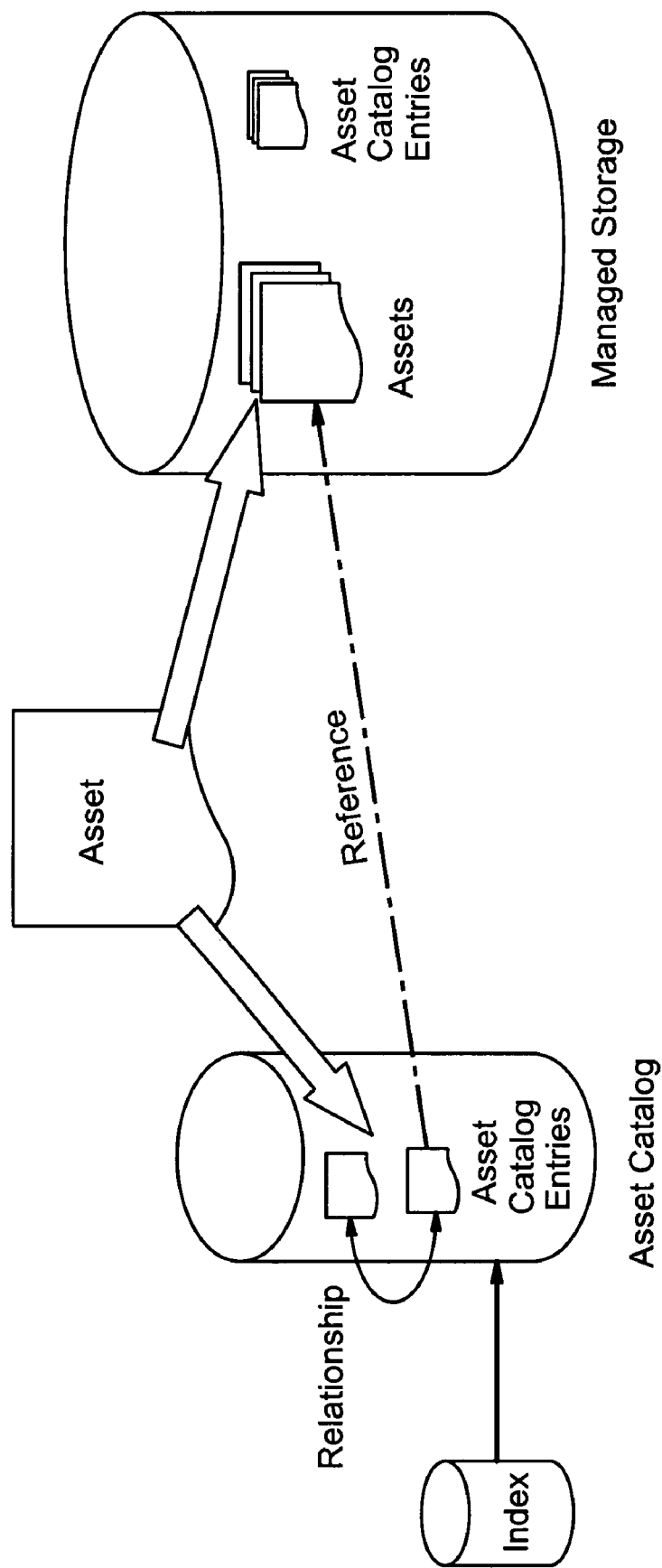
FIG. 8 is a high-level view of the storage of assets in an asset catalog and a managed storage location, in accordance with an example embodiment.
Figure 9:
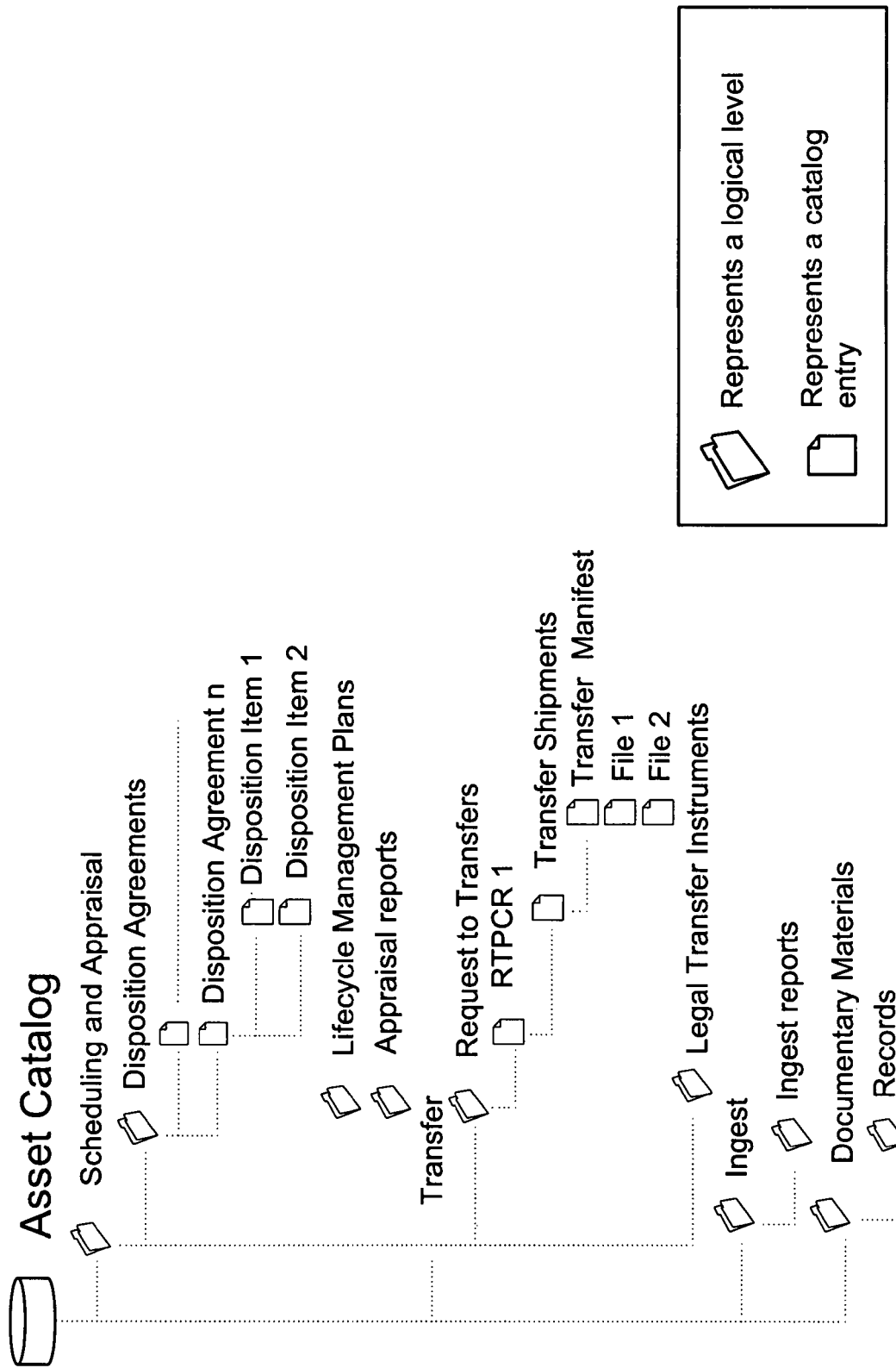
FIG. 9 is an illustrative hierarchical, logical view of an asset catalog in accordance with an example embodiment.

FIG. 8 is a high-level view of the storage of assets in an asset catalog and a managed storage location, in accordance with an example embodiment. As can be seen from FIG. 8, an asset is stored in both the asset catalog and the main, managed storage area. FIG. 8 also shows two kinds of ACEs, one corresponding to actual data and the other corresponding to a linkage. FIG. 9 is an illustrative hierarchical, logical view of an asset catalog in accordance with an example embodiment. FIG. 9 helps to demonstrate the relationship between the asset catalog and the generic OAIS model, as well as between the logical and level and catalog entries within the actual asset catalog.

3.3.2 Illustrative Storage Design for the Asset Catalog

The storage subsystem may be a set of identity and electronic data storage services designed to address the extreme scale and longevity problems discussed earlier. The storage subsystem may use underlying commercial storage systems (e.g., file systems, relational databases, object databases, etc.) and provide additional capabilities, such as support for federating storage and making changes to these commercial storage systems (e.g., capacity, location, and vendor implementations) transparent to the asset catalog and other parts of the archive system.

3.3.2.1 Illustrative Object Identification Scheme

An object identifier scheme may be devised to provide immutable and scalable identifiers for objects, such as assets and ACEs. The scheme may involve two types of identifiers: Asset Identifiers (AIDs), or a time and universally unique, multipart (e.g., four part) identifier that is used and determined during ingest before final storage allocation is made within archival storage; and Universal Resource Identifiers (URIs), or a standards-based, time and universally-unique identifier that can be used to reference and access the asset in archival storage. Having separate steps for determining an assets AID and URI may allow unique identifier assignment to take place independently from and before storage and handling are considered. Moreover, the two IDs may serve different purposes. For example, the AID may be immutable so that internal and/or external references do not go stale (e.g., never become invalid, unless the asset is deleted) that would otherwise be related to a change in AID schemes or numbering, while the URI may provide an industry-standard mechanism for accessing the asset and necessarily may have elements to it that may change over time (e.g., path).

An AID may be arranged as a four parts item, for example: registry.package.part.item. In this example, the registry is the highest level collection of assets that can be assigned to an archive system instance (e.g., at a geographical site) or moved between instances. The Registry element of an AID may be determined based on the ERA instance to which the asset was submitted for archive, with the ERA itself being composed of multiple instances, each with its own registry or registries. A package is a collection of assets ingested together (e.g., a unit of work of ingest) that is unique within a registry and may correspond to a transfer group or transfer shipment. A part is a subdivision of a package created by the system to manage the size and number of assets in a package and to provide the ability to optimize the physical storage of different types of assets in the same package (e.g., large images versus small documents). The Part element of the AID may be a unique identifier generated as the assets in a Package are ingested. Separation also may be into groups that will subsequently be stored together to avoid item-level registration in the asset catalog. For the ERA, a "part" may be initially based on the transfer shipment number. Lastly, an item may be a system generated name of the asset as stored in archival storage, and may be globally unique (e.g., according to RFC 4122) to enable item-level reorganization of storage without concern for name collisions (for example, should multiple Parts be merged into a single Package). It may be unrelated to the original filename of an asset which, along with its directory structure, may be kept as metadata (e.g., file attributes) within the ACE. This may help to ensure that there are no conflicting filenames in archival storage, and enables the use of a variety of commercial storage systems with reduced concern for compatibility of the naming scheme used for the original asset. AIDs may comprise system-generated elements so that they have reduced (e.g., no) dependence on external aspects (e.g., business domain or storage implementation aspects) whose change might otherwise cause a change in the AID.

When the asset is ready for archival storage, it may be assigned a URI by the Storage Locator. A URI may be given a standardized structure, for example: <scheme>://<authority>/<path>?<query>#<fragment>. There may be standardized path elements (e.g., file://server1.era.archives.gov/partition1/Documentary Materials/<dispositionItem>/<transferGroup>/<package>/<part>/<item>) and where the ERA's standard path elements begin with "Documentary Materials" and continue to the end of the URI. As this is a path, it is discussed under Storage Structure, below. It will be appreciated that portions of the path (e.g., <package>, <part>, and <item>) may be derived from the corresponding AID to reduce the operational effort required to map new packages to unique storage locations.

3.3.2.2 Illustrative Storage Structure

The storage structure may be reflected in the URI, which includes a server name and the file path outlined below. The URI, and thus the storage structure, may be assigned by the Storage Locator. Thus, it may reflect the business conventions of this particular implementation and may serve to illustrate a typical mapping of assets to physical storage. In particular, the storage structure may be hierarchically organized as follows, although it will be appreciated that the same is provided by way of example and without limitation:

```
<server>
    <storage partition>
        "Asset Catalog Entries"
            <disposition item>
                <transfer group>
                    <package>
                        <part>
                            <item>
        "Other"
            <package>
                <part>
                    <item>
        "Business Objects"
            <package>
                <part>
                    <item>
```

-continued

```
"Documentary Materials"
    <disposition item>
        <transfer group>
            <package>
                <part>
                    <item>
```

In the foregoing structure, <server> is a logical hostname used for <authority> in the URI (e.g., server1.era.archives.gov); supports scaling, transparency of server location and physical server implementation, and storage tiering since it can refer to any arbitrary number and type of server and regardless of their location. <storage partition> is a logical file system name. This may be a file system of a commercial storage system, and the path element may reflect the largest units of storage provided by commercial storage systems and reflect how multiple storage systems may be aggregated in arbitrarily large numbers. Documentary Materials|Business Objects|Asset Catalog Entries may be literal path elements in the ERA. These categories may reflect a separation of items on the basis of access characteristics and business conventions. These three categories have different access and volume characteristics in the ERA. These may be mapped to different partitions.

<disposition item> may be an identifier of the business object defining the handling of the asset (e.g., destruction instructions vs. transfer to ERA, retention time (and whether permanent vs. temporary) and access conditions, etc.). This element may reflect a separation on the basis of business domain-derived handling characteristics, which may bear upon where the asset is stored. It may include destruction instructions, which support automation of destruction based on the asset catalog and related business objects. Other may signify ACEs that are not for entries with a Disposition Item are stored here, e.g., an ACE for business objects. <transfer group> may be the business domain's set of assets that were authorized for a specific transfer into archives. This may be related to the package, but a whole transfer group may not arrive at the same time or in a quantity that gets ingested at once and, hence, a transfer group may not end up in the same package. This element may reflect a separation for convenience based on the needs of the business domain. <package>, <part>, and <item> may be taken from the corresponding portions of the AID.

3.3.2.3 Illustrative Storage Structure Functional Components 3.3.2.3.1 Object Identity Service The Object Identity Service may create object identifiers of varying types, including simple sequences (e.g., package identifiers), standard globally-unique identifiers (e.g., RFC 4122 identifiers for items), and the immutable, globally unique, four-part AIDs.

3.3.2.3.2 Locator Service

The Locator Service may determine the "Part" portion of the Asset ID for the Object Identify service in case the storage location will be a function of "Part" (e.g., elements of the ingested package have different handling characteristics). The Locator Service also may create a URI given an asset's AID and certain metadata. The resulting URI may be globally unique and may be used to store or retrieve and asset. The URI need not necessarily be immutable, and may change if the physical storage location of the asset changes. The metadata used in constructing the URI may allow the physical storage structure to reflect business objectives, and may allow optimization in the placement of various assets. Examples include ensuring data with different handling restrictions are segregated, ensuring all records for a given organization are stored together, and/or selecting a storage subsystem to match the access characteristics of a set of records, etc. In the ERA, the metadata used may include the asset type (e.g., documentary materials, asset catalog, business object), disposition item, transfer group, size, handling restrictions, etc. The AID used in constructing the URI may allow the number of rules to be reduced through the use of part or all of the AID as substitution parameters in the URI. For example, a rule may use Item as a file name, allowing a single rule to specify the location of all items for a given registry, package, and part. This may improve manageability of the archives as the number of items increases, and thus may contribute to overall scalability.

The service may apply storage rules, expressed in a table, to the inputs to determine the URI. Input metadata and rules may be for individual assets or a set of assets (e.g., ignoring the item identifier) so that one set of rules enables both the flexibility of locating a single asset and efficiencies in locating a large set of assets. Rules also may include the application of hash or round-robin functions to distribute assets among eligible partitions for scalability and performance reasons.

Rules may allow a single asset or set of assets to be mapped to more than one URI, enabling redundant storage (e.g., of primary and replica copies). Each URI may specify different servers at different physical locations, supporting disaster recovery as well as improved access performance based on physical proximity to the requestor. Rules also may specify the scheme of the URI (e.g., http://, file://, sql://, ldap://) enabling different storage systems (e.g., web servers, file systems, relational databases, and object databases) to be used for different types of assets. This may provide scalability and performance for assets ranging in size from a single email message to large scientific data sets.

The Locator Service may help to ensure that there is enough storage available at a prospective storage location. Thus, by managing space across commercial storage subsystems (e.g., file systems), the Locator Service may provide an aggregate storage subsystem equal to the sum of its constituent subsystems. This may provide one aspect of scale. The Locator Service also may have functions for managing the storage rules, e.g., creation and maintenance of the storage rules. These functions may be exercised by system administrators, who maintain the rules.

3.3.2.3.3 Storage Federator

The Storage Federator may provide common and standard URI-based asset and ACE access functions (e.g., read, write, delete) across federations of storage and archives systems for each archive system instance. As assets are created/stored, their associated ACE may be created and/or updated. The Storage Federator may choose the location from which to access assets, whether that location is in the local instance's archival storage, the local instance data store (for cached ACEs), or the archival storage system of another instance in the federation. The Storage Federator may perform local caching of remote assets to improve performance. By federating services, the Storage Federator may provide an aspect of scaling by allowing the continued inclusion of additional members of the federation. The Storage Federator also may support disaster recovery when applied for the remote storing of replica assets.

Figure 6:
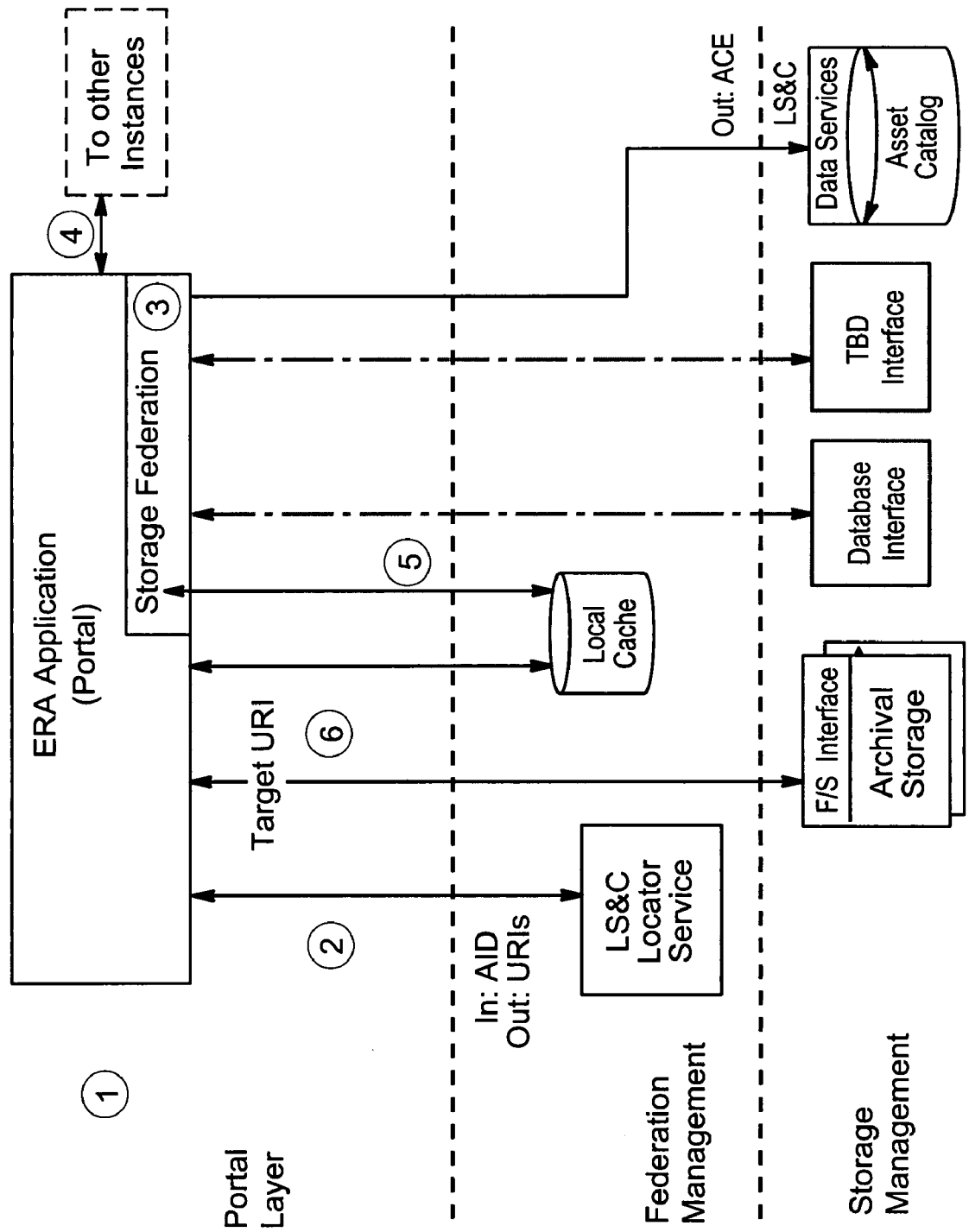
FIG. 6 is a storage federator looking across multiple instances of an asset catalog, in accordance with an example embodiment.

As one example, FIG. 6 is a storage federator looking across multiple instances of an asset catalog, in accordance with an example embodiment. Here, the Application (1) controls various processes, including invoking the Locator Service (2) with an Asset Identifier, and the storage Federation (3) chooses the location from which to retrieve the asset via a Storage Federation interface (4) retrieving the content from non-Local Managed Storage if file is not already local to that Instance. A local copy (5) of the file is made in local cache if and only if the file was remote, and the file retrieval of file that is now guaranteed to be local to that file (6).

3.3.2.3.4 Central Data Management

The Central Data Management service may provide a low level, URI-based storage access interface (e.g., read, write, and delete files and file attributes, directory listings), e.g., to files, partition (e.g., file system) indirection (e.g., logical file system naming, for transparency of physical file systems), and host indirection (logical server naming for transparency of physical server). This service may be provided by commercial products or potentially via the provision of thinly wrapped custom services on top of commercial products so that a common interface to heterogeneous file systems, databases, and naming services is available to the Storage Federator and other functions.

3.4 Illustrative Scenario

The following scenario illustrates some of the structure and functionality of the asset catalog and ERA, in accordance with certain exemplary embodiments. It will be appreciated that the following scenario is provided by way of example and without limitation.

1. The storage system administrator installs a new storage server "server2.era.archives.gov" and creates a new partition "partition1" optimized for holding assets and "partition2" optimized for holding asset catalog entries.
2. The administrator uses the Locator Service to establish storage rules that determine the storage allocation and URI for a given asset. Storage is allocated to servers and partitions for a given type of electronic data (e.g., documentary materials, asset catalog entries, or other business objects), its handling characteristics (e.g., restrictions), size, and primary/replica purpose.
   a. createRule(type=Business Object, dispositionItem=N/A, handlingRestriction=any, UriAttribute=Primary, part=any, URI=file:// server2.era.archives.gov/partition1/Business Objects/<package>/<part>/<item>)
   b. createRule(type=Documentary Materials, dispositionItem=any, handlingRestriction=any, URI-Attribute-Primary, part=any, URI=file:// server2.era.archives.gov/partition1/Documentary Materials/<dispositionItem>/<transferGroup>/ <package>/<part>/<item>)
   c. createRule(type=Asset Catalog, dispositionItem=any, handlingRestriction=any, URI-Attribute-Primary, part=any, URI=file:// server2.era.archives.gov/partition2/Asset Catalog/ <dispositionItem>/<transferGroup>/<package>/ <part>/<item>)
3. A records manager user uses an application to approve a new Disposition Item. The application obtains a unique disposition item identifier "D1" from the Object Identity Service, e.g., by requesting an ID and providing the name of the ID generator for disposition items. D1 is returned to the application for future reference (e.g., when requesting the Storage Locator to assign storage location for assets associated with disposition item D1).
4. The transferring entity (e.g., a federal agency) who supplies the assets to be archived requests a new transfer under disposition item D1.

5. The transfer processing application gets a Transfer Group ID using the Object Identity Service and the name of the ID generator for transfer groups.
6. The transferring entity transfers files to ERA (e.g., to Ingest Working Storage) in multiple Transfer Shipments.
7. The transfer processing application processes each transfer shipment, getting a new Package ID for each shipment or collection of shipments it processes at once. The Package ID is obtained from the Object Identity Service using the name of the ID generator for packages.
8. The transfer processing application processes each item (e.g., file) within the transfer shipment, and gets a new Asset ID for each file using the object identity service and the name of the asset ID generator. The asset ID generator may incorporate the registry, package, and part identifiers as well as the item identifier into the Asset ID.
9. The transfer processing application creates an asset catalog entry for each asset, records the asset identifier in the Components of the catalog entry, and gets an Asset ID for the catalog entry itself.
10. After transfer processing, assets are ready to be stored into archival storage, along with corresponding asset catalog entries. The application requests that storage locations be assigned to each asset, associated ACE, and/or other stored item by supplying the AID and associated metadata to the Storage Locator. The Storage Locator uses rules specified above to assign and/or record a specific storage location for the item asset, set of assets, and/or ACE, and returns the resulting URI(s) or URI template for the item, asset, and/or ACE.
11. The assets and associated catalog entries for all assets in the transfer group are written to the archives system using their URIs input to the Storage Federator. Directories are created, as needed (e.g., as specified by the path in the URI).
12. A user searches the catalog of assets. The search engine distributes the request to other search engine instances in the federation, and returns all references to matching catalog entries. When the user selects a specific catalog entry, the application requests its location from the Storage Locator using the AID of the catalog entry. The Storage Locator uses the AID to look up and compute the assigned storage location, and returns the corresponding URI. The application then requests the entry itself from the Storage Federator using the URI.

3.5 Asset Catalog Extreme Scalability and Longevity

In view of the foregoing description of the asset catalog and its components, it will be appreciated that certain example embodiments provide techniques for extreme scaling and longevity, as enabled by the following features (which may be implemented alone or in various combinations):

Provision is made for the federation of independent archival systems (ERA instances) into a larger whole, yielding potentially unlimited scalability through the addition of instances to the federation, as well as autonomy in the operation of each instance in the federation.

Identifiers and functions span the federation, providing location transparency and enabling asset relocations with a reduced impact to the asset catalog or any external references to asset identifiers.

Storage functions and parameters may be independent of the storage mechanism, providing transparent storage access across heterogeneous storage system products and enabling storage technology changes having a reduced impact on applications. Physical asset locations may be specified using URI standards, providing a standard syntax for additional asset storage schemes, e.g., based on http, sql, and/or ftp, etc.

Provision of an architecture may provide federated search and storage capabilities, offering a number of advantages over one based on a single product, including support for performance/scalability optimization, risk management, long-term cost leverage, evolvability, etc.

Federation of multiple asset catalogs using different registry identifiers may provide scalability by reducing the need for synchronous updates of a global catalog and allowing catalogs to be partitioned for performance.

Immutable asset identifiers enable assets to be reliably referenced indefinitely within the catalog and also by external systems.

A flexible and evolvable asset catalog design may accommodate changing metadata needs over long periods of time with minimal impact to applications or existing catalog entries.

Unlimited relationships between catalog entries may provide the flexibility to construct arbitrary asset aggregates and alternative taxonomies, including those arising from changing needs over time.

Support for indefinite numbers and types of asset representations may enable creation of digital adaptations while preserving the original assets.

A flexible security descriptor may accommodate a variety of access restrictions based on security classification, handling restrictions, group membership, etc. in a manner that continues to provide good performance and manageability as the number of objects increases.

Separation of asset catalog entries from the assets themselves may enable the archive to store and describe any particular set of electronic asset types while retaining compatibility of assets with existing applications.

Storage performance at extreme scales is provided through:
  Structured asset identifiers that facilitate high-performance mapping of asset IDs to physical storage locations;
  Direct use of commercial file systems (e.g., instead of XML DBs, for example), including their native features for performance and scaling, such as clustering, load leveling, failure recovery, etc.;
  Caching of data among federation members and on faster storage tiers (e.g., ERA's Instance Data Storage);
  Functions that distribute assets across storage systems for parallel access; and/or
  Storage functions that choose storage partition locations based on and tuned to assets' access characteristics.

Search performance at an extreme scale is provided through partitioning and/or federation based on structured asset identifiers and flexible storage location mapping:
  Data may be partitioned and indexed by archival level or other metadata, allowing searches to focused or constrained based on business value, metadata richness, known access patterns, etc.
  Browsable navigation links among catalog entries may help ensure that the entire catalog can be accessed even if only the top hierarchy levels are indexed for searching.

Figure 7A:
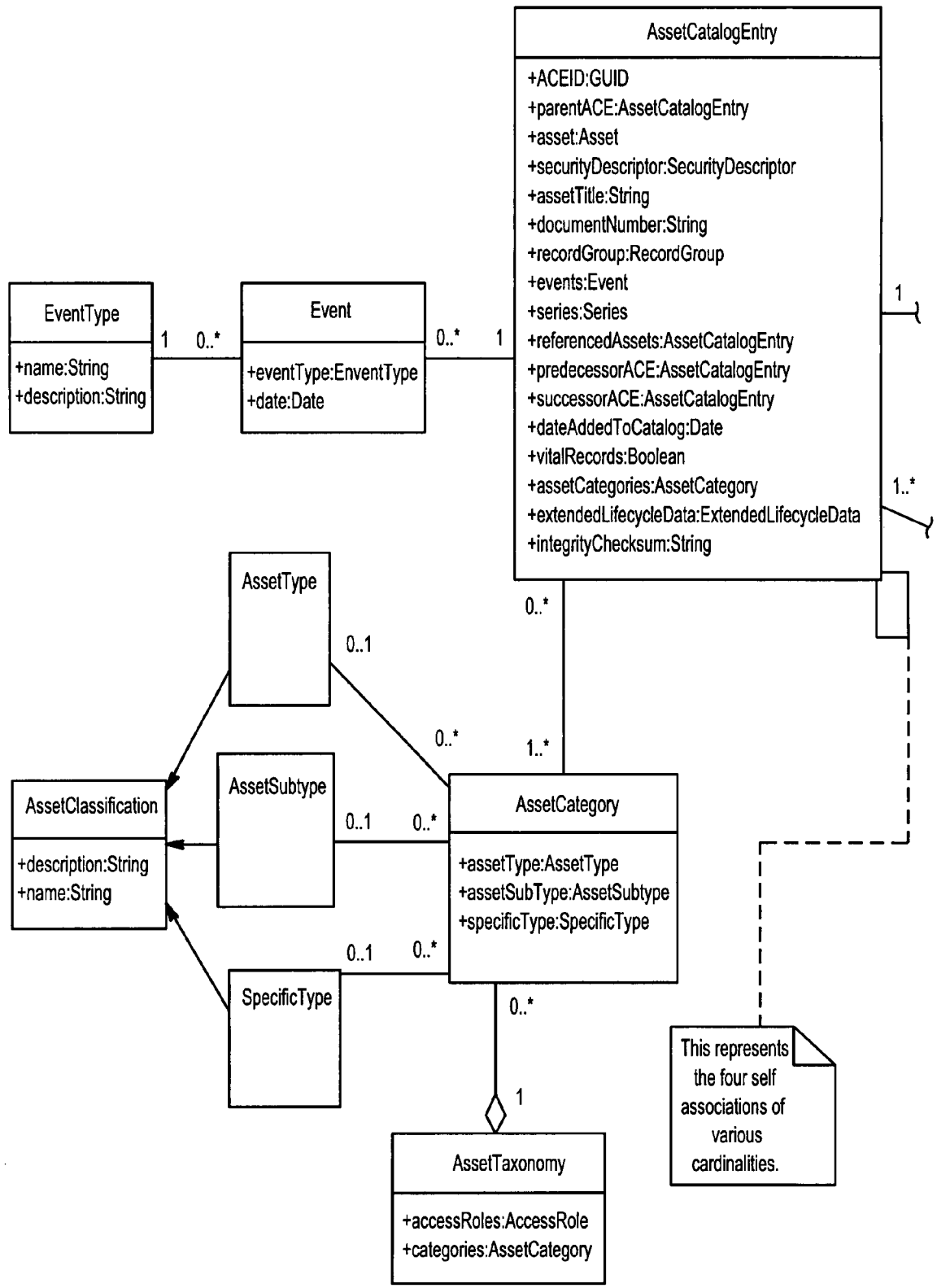
FIG. 7 is an illustrative logical data model class diagram for an asset catalog, in accordance with certain example embodiments.
Figure 7B:
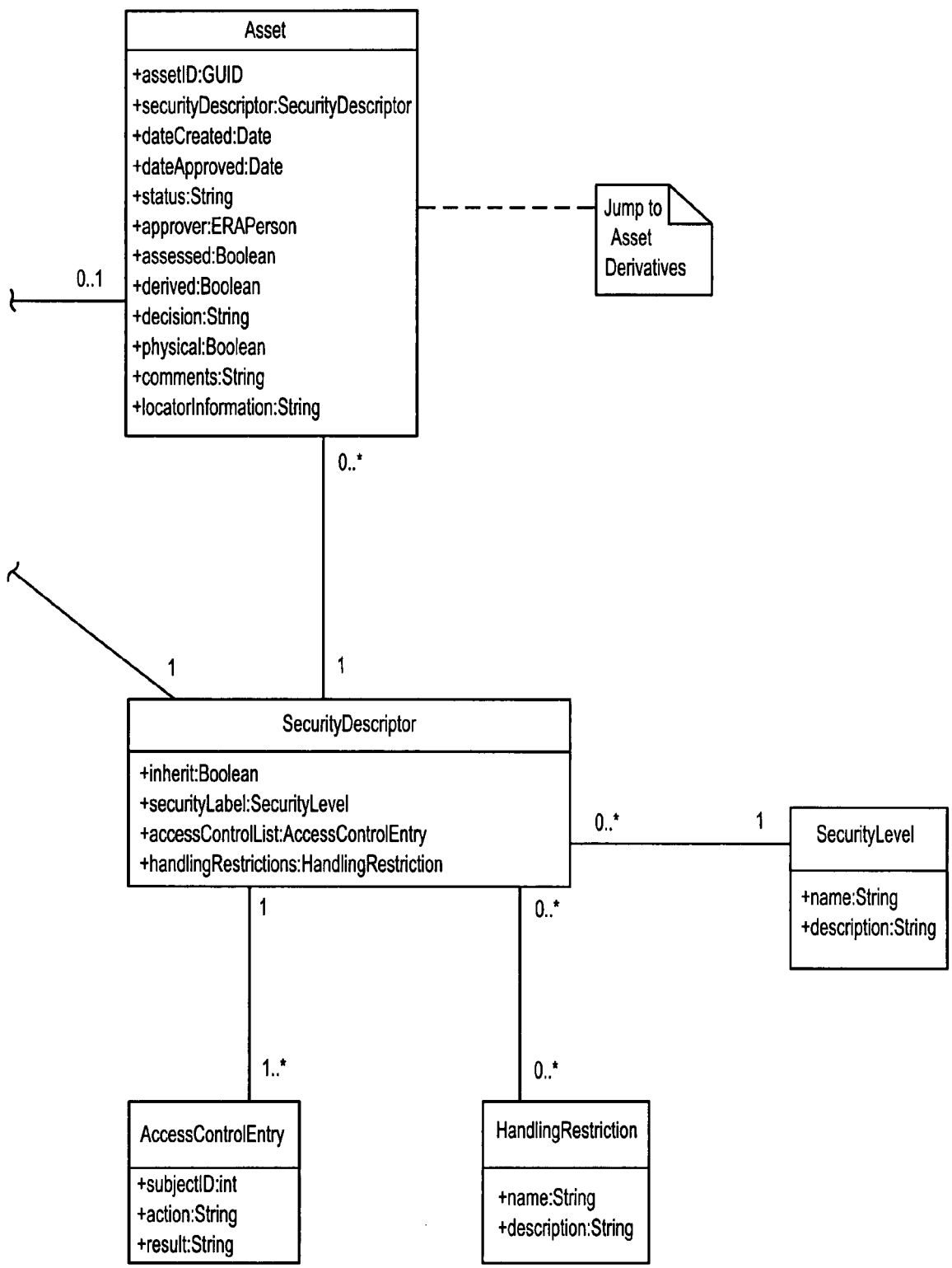

FIG. 7 is an illustrative logical data model class diagram for an asset catalog, in accordance with certain example embodiments. It represents the persistent objects and associations used to model the Asset Catalog in accordance with an example embodiment, although it is not a complete view of all objects stored in (or storable in) the asset catalog. In this example, asset is an abstract parent class representing any type of object (e.g., file, record, or business object) stored in Archival Storage. It will be appreciated that is only one instance is shown, though many instances may be implemented across a number of locations.

4. Summary of Approaches

This section summarizes alternatives to storage model and server architecture configurations. It will be appreciated that the options within each category may be used independently or in combination, and that various options between categories may be used independently or in combination. As such, the present invention is not limited to a particular storage model/server architecture configuration, and that certain embodiments of the present invention may implement various combinations thereof.

4.1 Storage Model Summary

Figure 11:
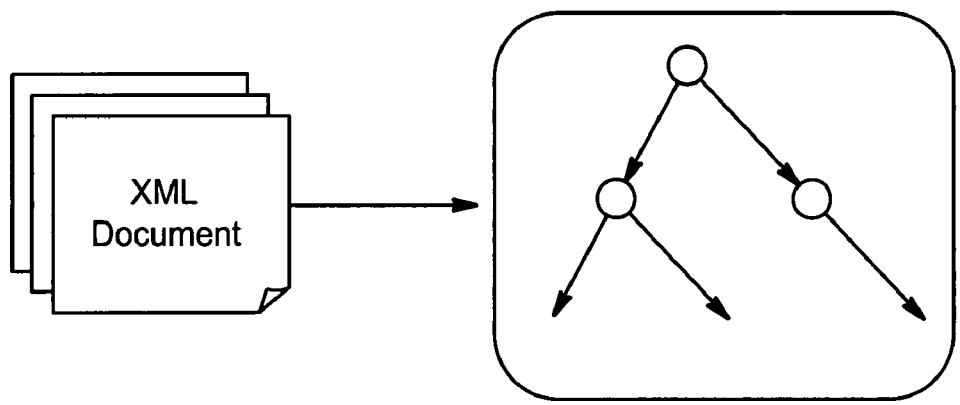
FIG. 11 is an illustrative schematic representation of a storage approach that includes storing XML in Native XML DBMS.
Figure 12:
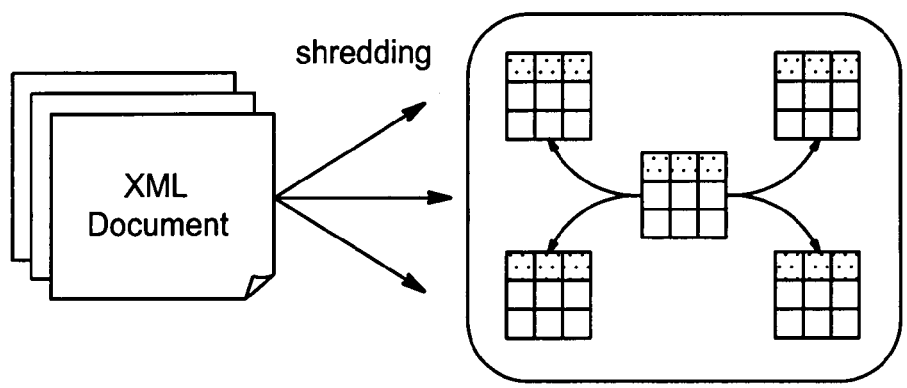
FIG. 12 is an illustrative schematic representation of a storage approach that includes storing shredded XML into object-relational tables.
Figure 13:
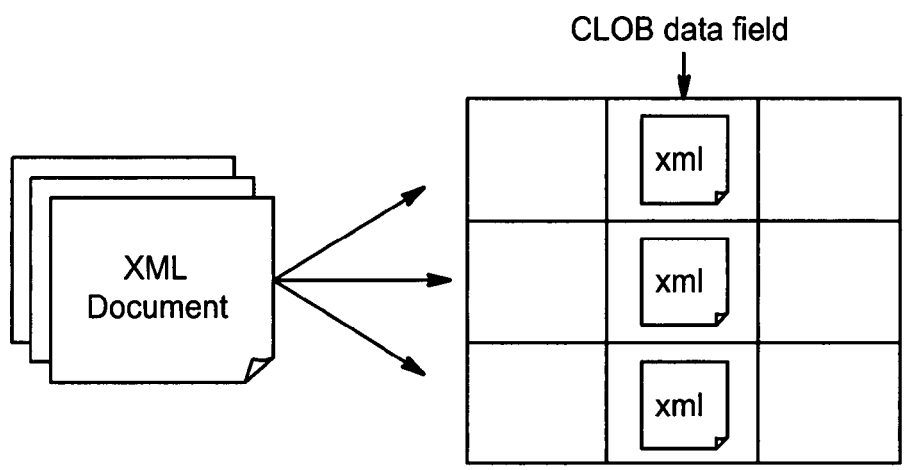
FIG. 13 is an illustrative schematic representation of a storage approach that includes storing XML in database CLOBs.

The use of a tagged text (XML) format for the asset catalog entries enables a variety of different storage models to be used for the asset catalog. For example, catalog entries may be stored as text files in a file system, normalized entities in a relational database, XML documents "shredded" into a relational database, binary or character objects in a relational or object database, or XML documents in an XML database. FIGS. 11-13 illustrate several of these storage architecture approaches. The particular storage model used for a set of catalog entries can be optimized to the characteristics of those catalog entries and associated access patterns. For example, small catalog entries with a uniform set of scalar attributes that are frequently updated can be stored in a relational database to enable fast parametric search and transactionally-secure updates, whereas catalog entries with a large amount of static descriptive text can be stored as files in a file system to enable fast full-text search by a search engine optimized for that purpose.

Support for multiple storage models within the same system is further supported by the structure of the asset identifier and storage URIs. Specifically, different "registries" (the first portion of an asset identifier) can be used within the same system, where each registry uses a distinct storage mapping and asset lookup scheme optimized for different storage models. Similarly, different URI "schemes" can be used within the same registry, where each scheme maps to a different storage model and a specific scheme is selected for a set of assets based on metadata passed during storage assignments.

These mechanisms supporting different storage models have been implemented and assessed in example embodiments. While all proved feasible, files in a file system (and indexed by a search engine) provided the best fit for archival applications requiring extreme scalability for a large number of relatively static managed assets. As storage technologies change over time, different storage models can be seamlessly integrated into a system without changes to the fundamental catalog structure or storage management components.

5. Assessment of Search Server Architectural Approaches

There are a variety of architectural approaches that can be used to improve the performance, scalability, and results quality of searches of the asset catalog, such as, for example, clustering, federation, distributed indexing, caching, logical partitioning, etc.

Figure 14:
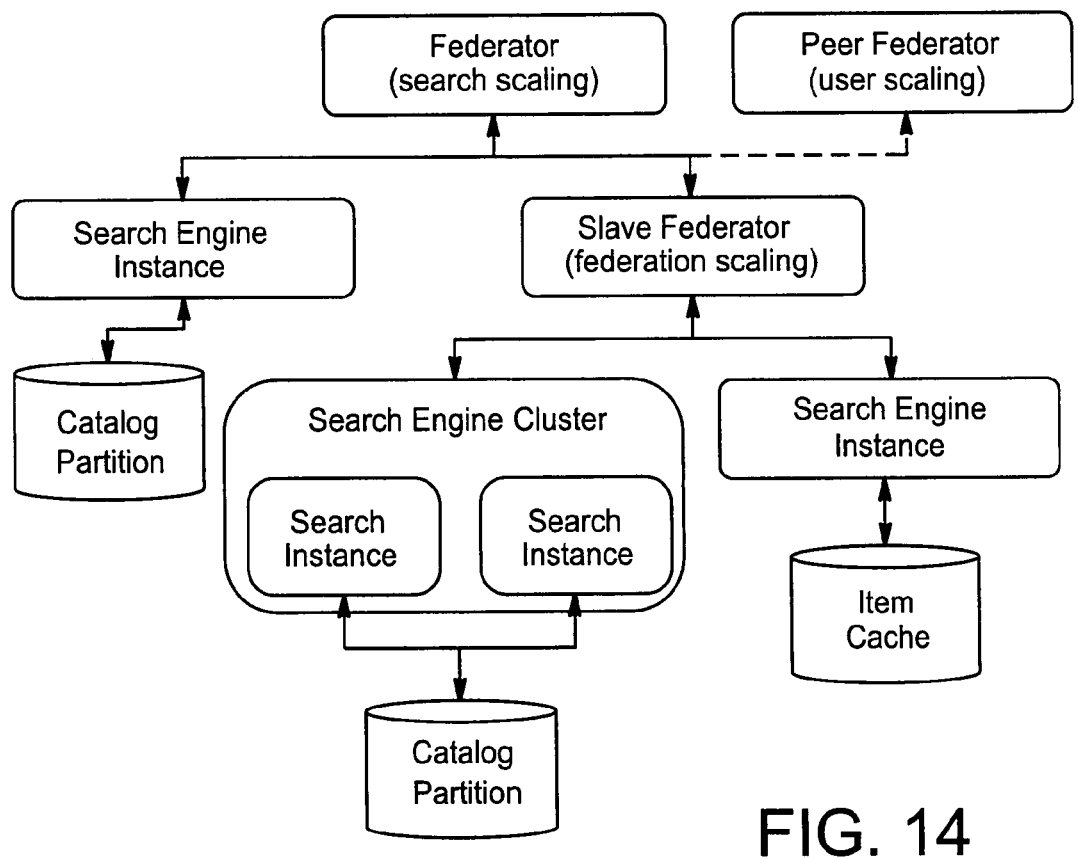
FIG. 14 is an illustrative search server approach that uses hierarchical federation as the basis for (theoretically) substantially unlimited scalability, augmented with clustering and caching.

Federation, caching, and logical partitioning may be used as mechanisms to meet both the general requirements of document searching and the unique requirements of the ERA. Clustering and distributed indexing can be used as strategies to satisfy performance and availability requirements. An approach that uses hierarchical federation as the basis for unlimited scalability, augmented with clustering and caching, is depicted in FIG. 14. Each of the search server architectural approaches are discussed in the following sections.

5.1 Clustering

Figure 15:
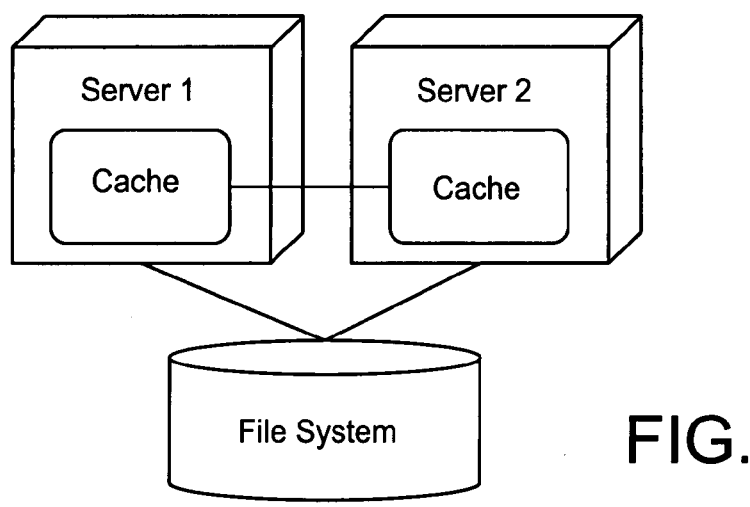
FIG. 15 is an illustrative search server approach that implements clustering using a shared-data architecture.

Clustering uses a shared-data architecture as depicted FIG. 15. The advantages of this approach relate to improved availability and efficiency. First, because persistent data is shared by all servers in the cluster, the data remains available even if one server fails. Second, because data is shared, dynamic load balancing can be used to take advantage of the server resources that are available.

Clustering requires mechanisms to monitor the health of each server in the cluster, remove failed servers from the cluster, add servers to the cluster, and synchronize data caches across servers in the cluster. For example, loss of "heartbeat" can cause servers to be unnecessarily pulled out of the cluster, and missing OS patches can cause fail-over mechanisms themselves to fail.

Caching helps maintain good performance in data-intensive applications but, in clusters, caches of the same data on different servers must be kept synchronized, which becomes more difficult as the size of the cluster grows. Experience with network attached storage systems suggests that scaling beyond 100 servers on a shared file system is a journey into uncharted territory.

5.2 Federation

Figure 16:
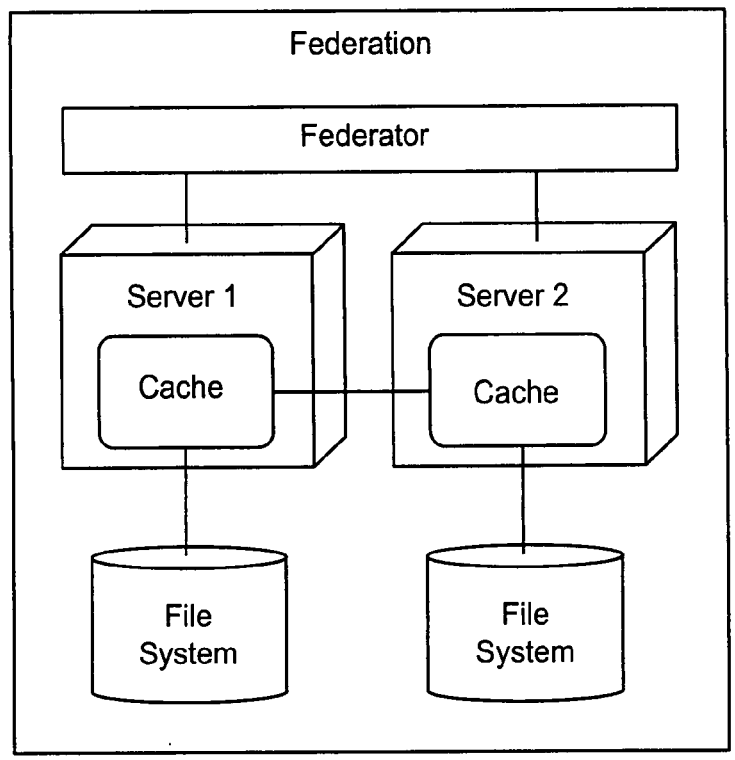
FIG. 16 is an illustrative search server approach that implements federation using a shared-nothing architecture.

Federation uses a shared-nothing architecture as depicted in FIG. 16. In short, because federation provides scalability and evolvability with a controllable increase in complexity, this approach is advantageous.

More particularly, the advantages of this approach relate to high scalability, evolvability, and functionality. First, a shared-nothing architecture allows near linear scaling—for example, processor, memory, and storage resources all scale incrementally as nodes are added. The most scalable systems in the world use either this architecture or the more exotic cache-coherent non-uniform memory access (ccNUMA) architecture. If the federator itself becomes a bottleneck, its workload can be split among a hierarchy of federators. Second, the federator acts as a mediator between the user and the search engine instances on each server, allowing different engines to be used for each instance. This allows new search engines to be plugged in over time. This evolvability allows for adapting to technology changes and maintaining a competitive framework where additional search engine instances can be selected purely based on price/performance. This allows for ensuring value to the customer in the long-run. Third, the federator corresponds closely to the concept of a search framework that allows different search engines to be plugged in to support searches of different media types (e.g., text, images, audio, etc.), and thus functionality becomes advantageous.

The federator represents an additional component that must distribute queries, consolidate search results, and media query/result formats. However, this complexity can be controlled by reducing the complexity of the query language and results, reducing complex result re-ranking schemes, and performing static (vs. dynamic) configuration of the federation. The federator itself can be purchased as a COTS product, or can be implemented as an orchestration using the ERA Enterprise Service Bus.

5.3 Distributed Indexing

This approach is similar to Federation. Though there is no universally accepted definition of distribution vs. federation, in common usage distribution implies a generally homogeneous set of search engines tightly coupled to a distributed index that uses a single consistent structure, whereas federation implies heterogeneous search engines each with their own index structure. Because certain ERA implementations may put a premium on evolvability and scalability, this approach is less advantageous than federation but more so than clustering, though it will be appreciated that such considerations will not be present in all implementations of the invention.

The advantages of this approach relate to scalability, simplicity, and functionality. First, distributed indexing can utilize shared-nothing architectures, and thus is just as scalable as federation approaches. Second, distributed indexing is available in existing COTS products. The query distribution and results consolidation is provided as out-of-the-box functionality. Additional features, such as administrative consoles for managing distributed servers and re-balancing indexes, may be provided in various products.

5.4 Caching

This approach caches records to allow fast searching on the most popular records. It is generally assumed that only a small fraction of ERA records ever will be accessed. This small fraction can be stored (using a least-recently-used cache management algorithm) and searched separately from the remainder of the archive. Users would be given the option to search only the popular items or, if they are willing to wait, the totality of the ERA holdings.

The advantages of this approach relate to scalability and search quality. First, the size of the cache depends on the number of access items, not the total archive size. This greatly improves scalability. Second, the caching algorithm essentially becomes parting of the ranking of documents. A good caching algorithm can enable users to find interesting and relevant results more quickly. The cache management function represents additional functionality that must be built, possibly as an orchestration using the Enterprise Service Bus.

5.5 Logical Partitioning

Figure 17:
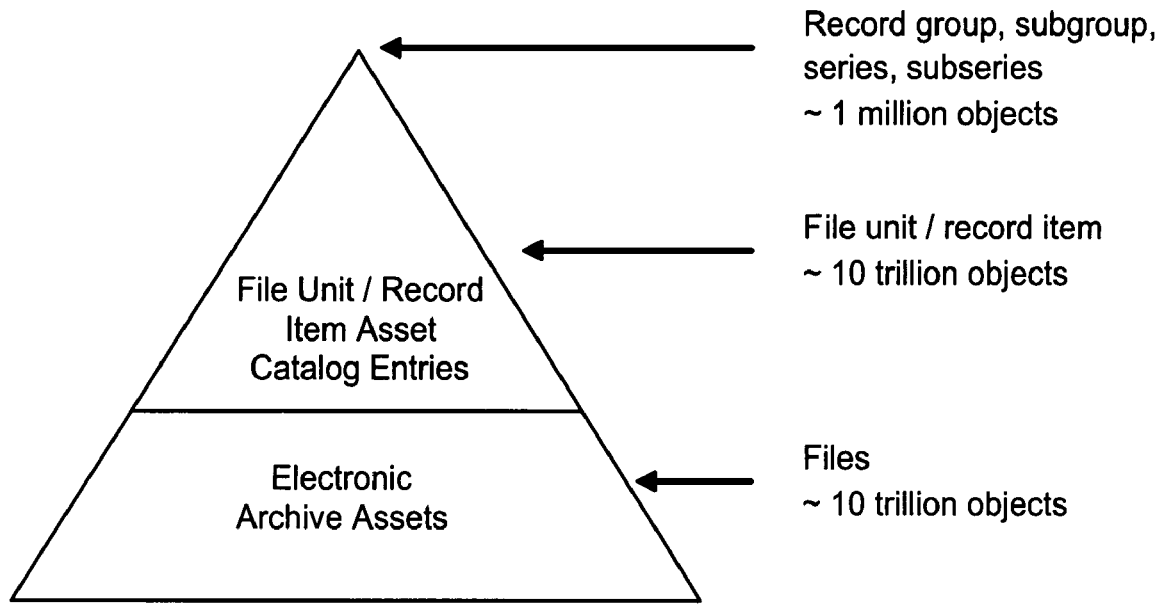
FIG. 17 is an illustrative search server approach that implements logical partitioning based on level of detail.

This approach partitions the catalog entries according to some user-visible attribute, such as, for example, the level of the referenced item in the record hierarchy, the item's data type, the collection or record group, etc. While data partitioning helps to enable query parallelism in clustering, federation, and distributed indexing approaches, the partitioning scheme does not need to have any logical basis (e.g., records can be distributed on a round-robin, hash, and/or other basis). Logical partitioning goes a step further by allowing users to select (or reduce) logical partitions from a search based on their search goals. FIG. 17 shows logical partitioning based on level of detail. Because of the importance of scalability and results quality in ERA, logical partitioning is advantageous.

The advantages of this approach relate to query scalability, efficiency, and results quality. First, logical partitioning supports query parallelism when combined with other approaches, including, for example, clustering, federation, distributed indexing, etc. Moreover, logical partitioning potentially allows the vast majority of detail (file or "inventory" level) catalog entries, most of which have little or no descriptive metadata, to be excluded from queries. Both the absolute number and growth rate of items at the series level and above is much lower than items at the file level. Consequently, searches on higher-level items scale better as the archive grows. Second, eliminating partitions from a query reduces the load on the servers for that partition. The resources saved can be used to lower the cost of the system or handle more users and more queries. Third, because there may be a billion times as many detailed records as summary records, detailed records in a search result could overwhelm the user most interested in summary records. Similarly, searching a trillion records using a lexicon of less than a hundred thousand words likely will result in millions or billions of irrelevant hits. Logical partitioning helps to allow users to focus on areas and levels of detail of interest as determined by the user.

Logical partitioning generally requires a component in front of the search engine indexer to partition the data and send the appropriate catalog entries to each search instance. This component itself, however, should be very simple to implement.

5.6 Lifecycle Data Subsetting

This approach extracts a subset of life cycle data from the asset catalog entries for indexing and searching purposes. It recognizes the fact that a vast majority of the searches will be based on a small set of key attributes, such as, for example, title, description, archival dates, archival material type, record group, etc. Excluding other attributes from the searchable database thus reduces data volume without affecting usability.

On closer examination, this approach seems to solve a problem that is only created if data is stored in a database. If the full catalog entry cannot be effectively stored in a database and must be stored in a file system, then it seems more reasonable to simply index a subset of the fields directly using a text search engine rather than copying a subset of the fields into a database to index them there.

This approach is advantageous because the amount of searched data can be reduced, increasing scalability. The full catalog entry must remain available for browsing, so any extraction for indexing purposes may represent redundant data storage. Also, extracting the metadata subset and synchronizing updates may represent additional application complexity and cost. Of course, these considerations may not be significant in some embodiments of the invention.

6. Assessment of Text Search Implementations

Figure 10:
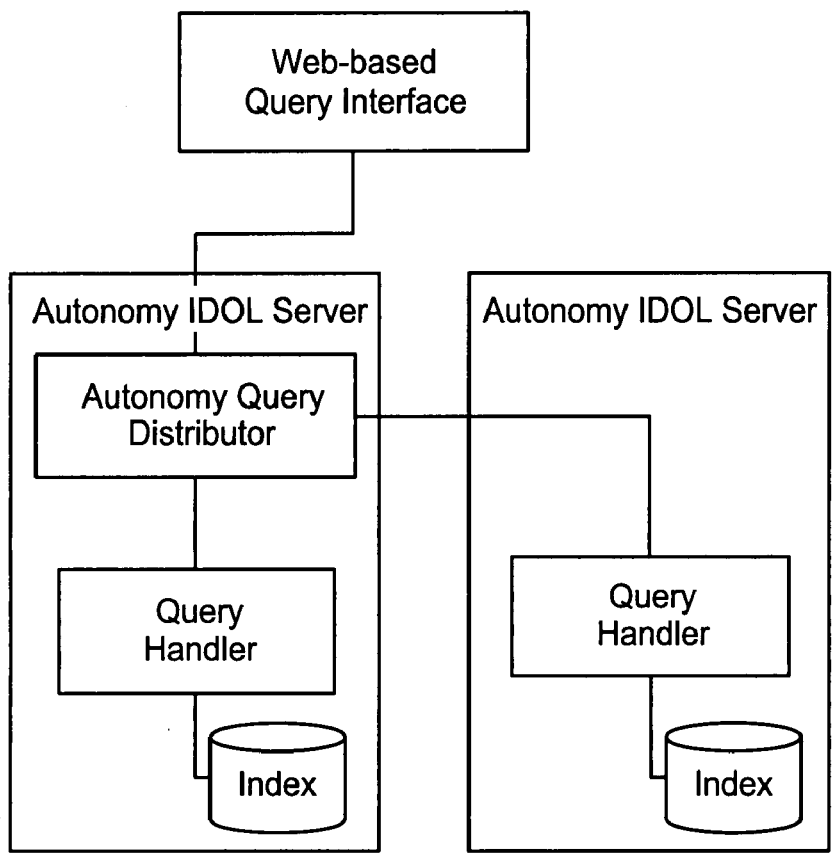
FIG. 10 is a sample search architecture configuration using Autonomy.

An example implementation considered two basic solution classes for asset catalog search—namely, database storage with an integrated text search index (represented by Oracle) and file system storage with a separate text search engine (represented by Autonomy, as illustrated in FIG. 10).

In a first approach, the coupling between storage and search tool is tighter in that, generally speaking, one component cannot be changed without changing the other. It provides many of the benefits associated with a strong database technology, mature tools, and very good single-instance (or "vertical") scalability. On the other hand, it tends to be more complex, although this may not be much of a consideration because much of the complexity is related to features not needed by the asset catalog.

A second approach provides loose coupling between storage and search engine. It allows flexibility to pick any search engine technology in the future, the ability to scale "horizontally" using numerous small servers, and rich text search functionality. On the other hand, it may not readily offer the broad functional features of a general-purpose DBMS, and (depending on the product) may not have as good single-instance scalability.

The following sections assess Oracle and Autonomy as representative implementations of these two solution classes, though other commercially available products could be used and/or supplemented or replaced with custom-built software and/or hardware modules.

6.1 Oracle Text

This alternative includes storing asset catalog search extracts in Oracle and using Oracle Text to provide full-text search capabilities. Data can be stored in, for example, relational, shredded XML, or CLOB XML form. Oracle implements clustering, (restricted) logical partitioning, and (restricted) distributed indexing, but does not currently implement federation.

Oracle Text provides full-text search capability for data stored in Oracle, regardless of whether the data are stored as traditional relational database columns, shredded XML, or XML in CLOBs. Technically, full-text ("CONTEXT") queries can be combined with restrictions based on scalar fields such as numbers or dates, but in practice the low selectivity typical of text queries can result in poor performance as index data is passed across internal interfaces. This is because the intersection of scalar and full-text constraints is computed during run time. On the other hand, compound text/scalar ("CTXCAT") indexes will perform well for the ERA, assuming the indexed text fields are small (few lines of text vs. several paragraphs or pages worth of text), because the intersection between text and scalar constraints is pre-computed at index construction time.

The strengths of this alternative relate to functionality and instance scalability. First, Oracle has very rich functionality typical of a mature database management system, including excellent transaction support, a rich query language that encompasses XML queries (XPath, XQuery), and the ability to mix relational and XML data models. However, because asset catalog entries are expected to be stored and retrieved as whole XML documents (rather than updating/retrieving part of a catalog entry), none of these capabilities is clearly needed. Oracle does not have any significant architectural limits on the number of documents in an instance. Further, instances can be clustered, and queries are automatically distributed to nodes in the cluster for processing. To enable query parallelism, however, data must be partitioned on a value in a relational column. Partitioning on XML attributes currently is not supported in the currently available commercial software version. However, future versions of the software and/or custom modifications may allow parallelism without explicit partitioning, for example, by dynamically allocating ranges of the documents (and their index entries) to different processors based on a sequential document ID.

Achieving acceptable performance with Oracle can require configuration by staff trained in Oracle. Retuning and reconfiguration may be needed if the actual characteristics of catalog data differ substantially from what was expected. Second, Oracle is a full-featured product and, as a result, it has a substantial resource "footprint" in terms of memory, CPU, and disk required just for the engine. The DBMS itself occupies roughly 500 MB of space. In addition, Oracle uses a "shared-everything" architecture that cannot convincingly scale beyond roughly 100 servers. Both of these factors drive the system architecture towards fewer, larger servers, or "vertical scaling" as opposed to "horizontal" scaling to large numbers of small servers. By contrast, the most well-known large text search implementations (e.g., Google) use hundreds or thousands of low-cost servers operating in parallel. Third, Oracle currently does not provide the rich functionality typical of special-purpose text search engines, such as keyword suggest (for example, "Did you mean X?") and run-time relevance scoring control, though this functionality is not clearly needed in all embodiments.

6.2 Autonomy IDOL

This alternative includes storing the asset catalog in the file system and using Autonomy to provide full-text search capabilities.

The strengths of this alternative relate to strong text search functionality and horizontal scalability. First, special purpose text search engines, including Autonomy, have a very rich set of search features. Relevance ranking can be controlled either at index time or at query time (for example, using a term weight multiplier in a query). Autonomy can also suggest alternative keywords or keyword spelling simply by adding "Spellcheck=true" to the query. It can efficiently return the total number of records meeting the search criteria. The first two features currently are not supported in Oracle, and the third typically requires issuing a query twice (once to get the count, once to get the query results). It will be appreciated that some advanced features, such as query result clustering, require storing the content inside Autonomy. Second, multiple search engine instances can be configured to respond in parallel to a single user query using a Distributed Query Handler. Because Autonomy uses a shared-nothing architecture (e.g., each instance has its own index storage), scaling to a large number of instances should be possible. Large search engines such as Google use this architecture to scale to hundreds of thousands of servers.

According to the vendor, one instance of Autonomy IDOL can index 30 million files of files about 1-2.5 KB in size. While one instance probably could index all aggregate level catalog entries (e.g., record group, series, accession/transfer) for many years, it would take thousands of servers to index billions of item-level catalog entries accumulated during that same time. Currently, there is no clustering support in an Autonomy infrastructure.

It has been observed that Autonomy's architecture is very well suited to a web infrastructure. It uses the http protocol for all functionality. Queries are nothing but parametric and text fields passed in a URL to the search engine. Responses are XML documents that can be messaged for presentation using an XSL Style Sheet and/or passed to an automated program for further processing.

7. Additional Factors Influencing the Assessments

There were several problems encountered during certain example implementations that further influenced the above assessments. First, the date fields in the Autonomy IDOL configuration were incorrectly set up. However when the engine configuration was updated, the server's indexing rate slowed down significantly—it went from approximately 4,100 documents/minute to 50 documents/minute. Thus, an important lesson learned relates to the time and care that must be used when initially setting up this commercial product, though those skilled with the product likely will not encounter such difficulties.

Second, some of the traditional unix utilities did not work well with large number of files. For example, copying multiple files with the cp command did not work. Browsing a directory with millions of files became virtually impossible with the ls command since it is not designed to operate on large number of files. However, one unix command that consistently worked well was find.

Third, certain example implementations required a considerable amount of time in setup and configuration of an Oracle RAC cluster of two nodes. RAC requirements are complex and range from needs for operating system patches specific to the kind of network switch that can be used to set up connectivity between nodes. In the end, the process turned out to be very time-consuming.

8. Results of Certain Example Implementation Exercises

Figure 18:
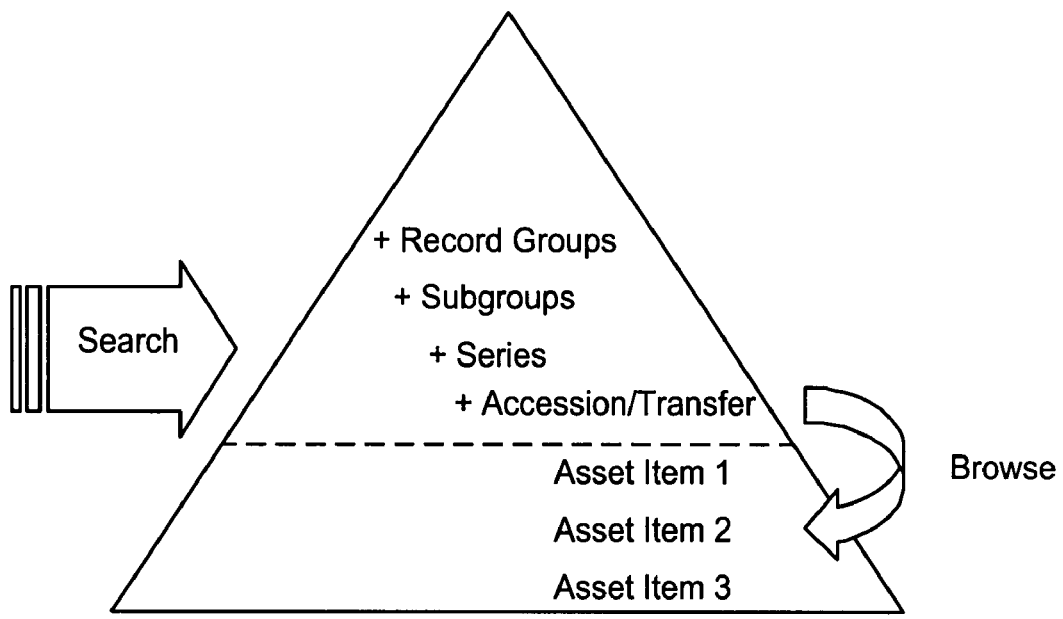
FIG. 18 is a schematic representation of an asset catalog search approach, in accordance with an example embodiment; and, FIG. 19 is an extremely large scale computer storage system in accordance with an example embodiment.

Based on certain proof-of-concept example implementations and associated analyses, the following observations and recommendations can be made. FIG. 18 is a schematic representation of an asset catalog search approach in accordance with an example embodiment.

First, file system storage offers an advantageous combination of scalability, performance, and flexibility compared to other storage models. Contemporary file systems can convincingly scale to the capacity required for the ERA, though multiple file system instances will no doubt be required. Performance is at least as good as or better than any database management system because the latter typically run on top of the file system. The flexibility of using a variety of search products with a variety of file system products reduces risk and improves evolvability. Using a dedicated text search engine to index and search files provides advantageous functionality in terms of full-text search features, and also appears to provide advantageous performance based on lab results. This solution, unlike database solutions, does not readily provide XQuery or intra-record transaction capabilities. However, for the ERA, it is anticipated that neither of these factors are a significant concern because catalog entries may be stored and retrieved as whole documents.

Second, certain example implementations also revealed that federation helps to ensure that the ERA scalability and evolvability requirements can be met, regardless of which search engine or storage method is selected. Neither of the commercial products tested could convincingly scale search capabilities to trillions of catalog entries (at least, not cost effectively) regardless of the data storage model used. Autonomy offers very good scalability using a distributed, shared-nothing architecture, but suffers from a fairly low limit on the number of documents per instance (thus requiring a large number of instances). Oracle offers scalability to many more documents per instance, but still cannot convincingly scale to the required number of instances using only its clustering capability. Of course, these results may not be applicable to all commercially available products, or to commercially available products supplemented with custom hardware and/or software, or to whole custom hardware and/or software embodiments.

An architecture that includes a federated search capability offers a number of advantages over one based on a single product, including, for example, support for performance/scalability optimization, risk management, long-term cost leverage, and evolvability. The catalog can be partitioned based on some characteristic (e.g., level of detail), and each partition can be indexed and searched using whichever product is better suited to the characteristics of that partition. For example, Autonomy could be used to search the relatively small number of record aggregate entries ($10^6$), which have substantial textual descriptions, and Oracle could be used to search the relatively large number of file "inventory" entries ($10^9$-$10^{13}$), which have little or no textual descriptions.

If actual experience with the products' performance against real data shows one search engine provides better performance, efficiency, scalability, etc., catalog entries can be steered to that search engine without disrupting the system. There is continued price-performance competition between the alternative products, because the product proving the best overall value (based on actual production experience) can simply be plugged in as additional search engine instances are added to scale the system over time. Technology independence and evolvability is clearly demonstrated.

Third, the study revealed advantages in partitioning the catalog based on level of detail (aggregate vs. individual asset items), and advantages in phasing in search requirements on item-level catalog entries. It is anticipated that the vast majority of descriptive metadata will be available at the aggregate level, with little or no useful metadata at the item level. Thus, indexing for search tends to make a great deal of sense at the aggregate level, but somewhat less so at the item level. At the same time, indexing just the fully-qualified file name of billions of assets can require significant resources. By focusing search in the near term on aggregate-level catalog entries then using browse (from search results) to access item-level catalog entries, the number of search servers required can be greatly reduced from hundreds or thousands to perhaps as few as one or two, with little or no loss in usability. Search server federation can be used to gracefully expand the search over time to the item level if more metadata becomes available via content summarization or other approaches.

These general conclusions can be used to make specific recommendations, which may be used alone or in any combination depending on the particular embodiment implemented. First, store all asset catalog data in the file system in at least two partitions, one for aggregate-level catalog entries and one for item-level catalog entries. Second, there may be support for and/or provided a single and/or multiple instance text search engine (e.g., such as in a federation), such as Autonomy, to index and search aggregate-level catalog entries. Third, ensure links are available from aggregate-level catalog entries to item-level catalog entries (e.g., from a transfer to individual files in the transfer) to enable browsing. Fourth, build or buy (e.g., based on lowest cost) a federator that supports the one selected text search engine immediately and provides the capability to add other search engines in the future.

10. Sample File Preparation

Following is an exemplary schemas that may be used in connection with an asset catalog system. It will be appreciated that the schema is provided by way of example only, and is not intended to limit the invention. Moreover, the example schema embeds a list of certain assumptions that were in place during several simulation exercises. Such constraints are artificial and should not be construed to limit the invention.

Figure 19:
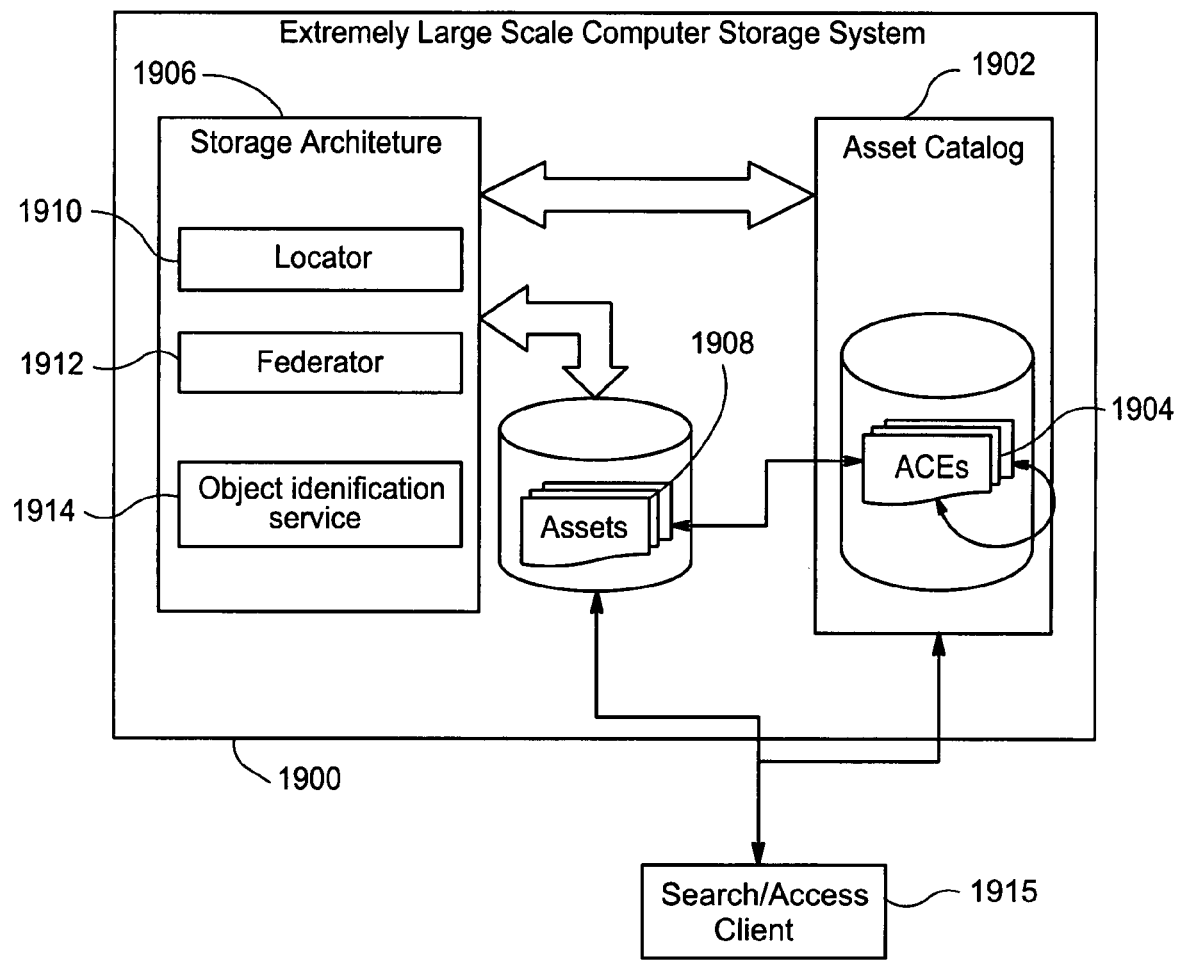

Given the above, it will be appreciated that certain aspects, features, and advantages may be combined to create yet further example embodiments. For example, FIG. 19 is a high-level overview of an illustrative system that combines certain aspects, features, and advantages from certain other example embodiments. More particularly, FIG. 19 is an extremely large scale computer storage system 1900 in accordance with an example embodiment. An asset catalog 1902 may comprise a plurality of asset catalog entries 1904 stored according to at least one schema and corresponding to a plurality of assets 1908. A storage architecture 1906 may be capable of storing the plurality of assets 1908, with the storage architecture 1906 comprising a storage locator 1910 and a federator 1912 (and, optionally, an object identification service 1914). An item identification scheme may be capable of providing identifiers to reference, locate, and/or access said assets 1908 and/or said asset catalog entries 1904 stored in the asset catalog 1902 in the storage architecture 1906. The computer storage system 1900 may be scalable essentially without limitation while maintaining asset storage and retrieval flexibility and substantially obsolescence-proof survivability of assets. Optionally, a search/access client 1915 also may be provided. Of course, it will be appreciated that the example embodiments shown and described in connection with FIG. 19 are provided by way of example and without limitation.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention. Also, the various embodiments described above may be implemented in conjunction with other embodiments, e.g., aspects of one embodiment may be combined with aspects of another embodiment to realize yet other embodiments.

What is claimed is:

1. An extremely large scale computer storage system having an asset catalog, comprising:
a plurality of asset catalog entries stored according to at least one schema and corresponding to a plurality of assets stored in an external storage architecture wherein said assets and asset catalog entries are referenced, located, and accessed according to an identification scheme, wherein the plurality of assets and the plurality of asset catalog entries are stored in different storage areas;
an asset catalog storage architecture configured to store the plurality of asset catalog entries, the asset catalog storage architecture being federated and partitioned to support searching, indexing, and accessing of the plurality of asset catalog entries and/or the plurality of assets using the identification scheme; and
one or more relations among and/or between at least some of the asset catalog entries and/or assets, each said relation being representable by the at least one schema, wherein the asset catalog is scalable essentially without limitation and is configured to enable the assets to remain accessible over time regardless of the assets' format(s).

2. The extremely large scale computer storage system of claim 1, wherein the asset catalog storage architecture is arranged so as to permit a highly-scalable federated search of the plurality of asset catalog entries and/or the plurality of assets.

3. The extremely large scale computer storage system of claim 1, further comprising a plurality of instances across which the asset catalog exists.

4. The extremely large scale computer storage system of claim 3, wherein the storage architecture is arranged so as to provide autonomous management of each said catalog instance.

5. The extremely large scale computer storage system of claim 1, wherein the one or more relations are indicative of at least a parent-child relation and/or a child-parent relation.

6. The extremely large scale computer storage system of claim 1, wherein the one or more relations are arranged to at least organize at least some of the assets into at least one component asset and/or at least some of the asset catalog entries into at least one component asset catalog entry.

7. The extremely large scale computer storage system of claim 6, wherein the at least one component asset and/or the at least one asset component catalog entry are arranged to comply with the at least one schema to provide at least one view and/or taxonomy of the assets and/or asset catalog entries.

8. The extremely large scale computer storage system of claim 1, wherein the at least one relation is arranged to support browsing relations such that all assets are reachable even if only a portion of the assets have been indexed for searching.

9. The extremely large scale computer storage system of claim 1, wherein the at least one relation is arranged to support enabling each component comprising a particular asset to be represented in multiple formats to enable long-term preservation, redaction, and/or versioning.

10. The extremely large scale computer storage system of claim 1, wherein the at least one relation is arranged to support at least allowing for a representation of relationships among and/or between each component comprising one or more assets.

11. The extremely large scale computer storage system of claim 1, wherein the at least one relation is arranged to create at least aggregate-level assets catalog entries and item-level assets catalog entries.

12. The extremely large scale computer storage system of claim 1, wherein the at least one schema includes specific and general metadata tags.

13. The extremely large scale computer storage system of claim 12, wherein the specific and general metadata tags are arranged to support providing indexing services for search and/or access of the assets and/or the asset catalog entries, efficiency and/or flexibility in metadata capture, and/or interpretation of metadata.

14. The extremely large scale computer storage system ass~catalog of claim 1, wherein the at least one schema incorporates a tag for label security.

15. The extremely large scale computer storage system of claim 14, wherein the tag for label security identifies an access level required for access, the tag for label security being comparable to a user security label associated with a user accessing the asset catalog to indicate whether the user is to be granted access.

16. The extremely large scale computer storage system of claim 1, wherein the at least one schema is provided in a tagged-text format.

17. The extremely large scale computer storage system of claim 16, wherein the tagged-text format allows the asset catalog entries to be stored in accordance with a plurality of technologies.

18. The extremely large scale computer storage system of claim 17, wherein the plurality of technologies includes file system, relational database, and/or object database storage structures.

19. The extremely large scale computer storage system of claim 16, wherein the tagged-text format enables recovery of content even when schema design information is lost and/or corrupted.

20. The extremely large scale computer storage system of claim 19, wherein the tagged-text is in a human-readable format.

21. The extremely large scale computer storage system of claim 16, wherein the tagged-text format is XML.

22. The extremely large scale computer storage system of claim 1, wherein said identification scheme provides a plurality of identifiers to reference, locate, and/or access said plurality of assets and/or said plurality of asset catalog entries.

23. The extremely large scale computer storage system of claim 22, wherein the identifiers are structured to map identifiers to physical storage locations of the asset catalog and/or storage architecture.

24. The extremely large scale computer storage system of claim 22, wherein the identifiers are universally unique, such that relations among and/or between the asset catalog entries and/or relations to one or more components comprising a particular asset are configurable to span multiple storage partitions and/or instances of a federation.

25. The extremely large scale computer storage system of claim 22, wherein the plurality of identifiers include two types of identifiers to reference, locate, and/or access said assets and/or said asset catalog entries, the first identifier type being an asset identifier (AID) type and the second identifier type being a Universal Resource Identifier (URI) type.

26. extremely large scale computer storage system of claim 25, wherein each said AID is a multipart identifier.

27. The extremely large scale computer storage system of claim 26, wherein each said AID is indicative of a registry, package, part, and item associated with the corresponding asset.

28. The extremely large scale computer storage system of claim 27, wherein the item name is unrelated to an original filename of the item, and wherein the original filename and corresponding directory structure is stored as metadata within a corresponding asset catalog entry.

29. The extremely large scale computer storage system of claim 25, wherein each said AID is defined during asset ingest and before a final storage allocation of the storage architecture.

30. The extremely large scale computer storage system of claim 25, wherein each said URI is a standards-based identifier useful for referencing and/or accessing the asset and/or asset catalog entry.

31. The extremely large scale computer storage system of claim 25, wherein each said URI is changeable over time.

32. The extremely large scale computer storage system of claim 25, wherein each said URI is assigned independent of storage of the corresponding asset and/or asset catalog entry.

33. The extremely large scale computer storage system of claim 25, wherein each said URI is structured as:
   <scheme>://<authority>/<path>?<query>#<fragment>
   and wherein each said URI includes standardized path elements.

34. The extremely large scale computer storage system of claim 33, wherein at least some of the standardized path elements are derived from the corresponding AID.

35. A computer-implemented method of managing an extremely large scale computer storage system with an asset catalog, the method comprising:
   storing a plurality of asset catalog entries according to at least one schema and corresponding to a plurality of assets stored in an external storage architecture wherein said assets are referenced, located, and accessed according to an identification scheme, and wherein the plurality of assets and the plurality of asset catalog entries are stored in different storage areas;
   providing an asset catalog storage architecture configured to store the plurality of asset catalog entries, the asset catalog storage architecture being federated and partitioned to support searching, indexing, and accessing of the plurality of asset catalog entries and/or the plurality of assets using the identification scheme; and
   establishing one or more relations among and/or between at least some of the asset catalog entries and/or assets, each said relation being representable by the at least one schema,
   wherein the asset catalog is scalable essentially without limitation and is configured to enable the assets to remain accessible over time regardless of the assets' format(s).

36. The method of claim 35, further comprising arranging the asset catalog storage architecture so as to permit a highly-scalable federated search of the plurality of asset catalog entries and/or the plurality of assets.

37. The method of claim 35, further comprising distributing the asset catalog across a plurality of instances.

38. The method of claim 37, further comprising arranging the storage architecture so as to provide autonomous management of each said catalog instance.

39. The method of claim 35, further comprising indicating at least a parent-child relation and/or a child-parent relation via the one or more relations.

40. The method of claim 35, further comprising organizing at least some of the assets into at least one component asset and/or organizing at least some of the asset catalog entries into at least one component asset catalog entry via the one or more relations.

41. The method of claim 40, wherein the at least one component assets and/or the at least one asset component catalog entry cooperate with the at least one schema to provide at least one view and/or taxonomy of the assets and/or asset catalog entries.

42. The method of claim 35, wherein the at least one relation supports browsing relations such that all assets are reachable even if only a portion of the assets have been indexed for searching.

43. The method of claim 35, wherein the at least one relation enables each component comprising a particular asset to be represented in multiple formats to enable long-term preservation, redaction, and/or versioning.

44. The method of claim 35, wherein the at least one relation at least allows for a representation of relationships among and/or between each component comprising one or more assets.

45. The method of claim 35, wherein the at least one schema includes specific and general metadata tags.

46. The method of claim 45, wherein the specific and general metadata tags provide indexing services for search and/or access of the assets and/or the asset catalog entries, efficiency and/or flexibility in metadata capture, and/or interpretation of metadata.

47. The method of claim 35, wherein the at least one schema incorporates a tag for label security.

48. The method of claim 47, wherein the tag for label security identifies an access level required for access, the tag for label security being comparable to a user security label associated with a user accessing the asset catalog to indicate whether the user is to be granted access.

49. The method of claim 35, further comprising providing the at least one schema in a tagged-text format.

50. The method of claim 49, further comprising allowing, via the tagged-text format, the asset catalog entries to be stored in accordance with a plurality of technologies.

51. The method of claim 50, wherein the plurality of technologies includes file system, relational database, and/or object database storage structures.

52. The method of claim 49, further comprising enabling, via the tagged-text format, recovery of content even when schema design information is lost and/or corrupted.

53. The method of claim 52, wherein the tagged-text is in a human-readable format.

54. The method of claim 49, wherein the tagged-text format is XML.

55. The method of claim 35, further comprising arranging the one or more relations to create at least aggregate-level assets catalog entries and item-level assets catalog entries.

56. The method of claim 35, further comprising providing, via said identification scheme, a plurality of identifiers to reference, locate, and/or access said plurality of assets and/or said plurality of asset catalog entries.

57. The method of claim 56, further comprising structuring the identifiers to map identifiers to physical storage locations of the asset catalog and/or storage architecture.

58. The method of claim 56, wherein the identifiers are universally unique such that relations among and/or between the asset catalog entries and/or relations to one or more components comprising a particular asset optionally are configured to span multiple storage partitions and/or instances of a federation.

59. The method of claim 56, further comprising including in each of the plurality of identifiers two types of identifiers to reference, locate, and/or access said assets and/or said asset catalog entries, the first identifier type being an asset identifier (AID) type and the second identifier type being a Universal Resource Identifier (URI) type.

60. The method of claim 59, wherein each said AID is a multipart identifier.

61. The method of claim 59, further comprising defining each said AID during asset ingest and before a final storage allocation of the storage architecture.

62. The method of claim 60, further comprising indicating in each said AID a registry, package, part, and item associated with the corresponding asset.

63. The method of claim 62, wherein the item name is unrelated to an original filename of the item, and further comprising storing the original filename and corresponding directory structure as metadata within a corresponding asset catalog entry.

64. The method of claim 59, wherein each said URI is a standards-based identifier useful for referencing and/or accessing the asset and/or asset catalog entry.

65. The method of claim 59, wherein each said URI is changeable over time.

66. The method of claim 59, further comprising assigning each said URI independent of the corresponding asset and/or asset catalog entry storage.

67. The extremely large scale computer storage system of claim 59, wherein each said URI is structured as: <scheme>://<authority>/<path>?<query>#<fragment> and wherein each said URI includes standardized path elements.

68. The method of claim 67, further comprising deriving at least some of the standardized path elements from the corresponding AID.

* * * * *